(12) United States Patent
Hussain et al.

(10) Patent No.: US 12,353,917 B1
(45) Date of Patent: Jul. 8, 2025

(54) EVENT-BASED RESOURCE ALLOCATION SYSTEM

(71) Applicant: Vanilla Technologies Inc., Bellevue, WA (US)

(72) Inventors: Amjad Hussain, Newcastle, WA (US); Kei Daniel Yasui, Los Angeles, CA (US); Alexander Pines, Los Angeles, CA (US); Samuel Winthrop Trapkin, Post Falls, ID (US); Steven D. Lockshin, Beaverton, OR (US); Eugene Michael Farrell, Sammamish, WA (US)

(73) Assignee: Vanilla Technologies Inc., Bellevue, WA (US)

( * ) Notice: Subject to any disclaimer, the term of this patent is extended or adjusted under 35 U.S.C. 154(b) by 0 days.

(21) Appl. No.: 18/963,034

(22) Filed: Nov. 27, 2024

Related U.S. Application Data

(60) Provisional application No. 63/603,895, filed on Nov. 29, 2023.

(51) Int. Cl.
*G06F 9/46* (2006.01)
*G06F 9/50* (2006.01)

(52) U.S. Cl.
CPC .................. *G06F 9/5027* (2013.01)

(58) Field of Classification Search
CPC ...................................... G06F 9/5027
See application file for complete search history.

*Primary Examiner* — Gregory A Kessler
(74) *Attorney, Agent, or Firm* — Dority & Manning, P.A.

(57) ABSTRACT

Provided are methods, systems, devices, apparatuses, and tangible non-transitory computer readable media for processing and allocating resources. Prompts that comprise requests for information associated with resource allocation instructions can be generated. Generation of the prompts can be based on resource documents that are associated with resources and comprise resource document fields. The resource allocation instructions can be associated with the distribution of assets of the resources to entities that comprise resource recipients. Based on rule data and received responses to the prompts, resource data can be generated. The resource data can comprise resource data fields that are based on the resource document fields and resource data field values that are based on the responses. Based on the resource data, indications associated with the resource allocation instructions can be generated. Furthermore, the indications can comprise visualizations of the distribution of the assets to the resource recipients.

20 Claims, 15 Drawing Sheets

EVENT-BASED RESOURCE ALLOCATION SYSTEM

FIELD

The present disclosure relates generally to event-based resource allocation systems. More particularly, the present disclosure relates to computing systems that are configured to generate resource data and implement rules-based techniques and machine-learning models that can process, allocate, and automatically update the resource data.

BACKGROUND

Resource allocation can be a complex process that involves various different entities that perform different parts of the resource allocation process. Due to the large quantity of documents that can be involved in resource allocation, as well as myriad rules and policies related to the underlying resources, a significant amount of time and effort can be expended in ensuring that the resources are properly allocated. Further, in response to changes in the rules or the composition of recipients of the resources, instructions to disburse resources can undergo numerous revisions that, in addition to being expensive, can significantly change the resource disbursal process. To address the many challenges associated with resource allocation, different types of software can be used to collect, store, and disseminate the resource information to others. However, the use of multiple software applications to manage resources can be burdensome and demand a significant amount of manual input. Additionally, generalized software applications may not be fully suited to meeting the often specialized requirements of resource allocation. As such, there are many different approaches that can be used in resource allocation.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method that can comprise generating, by a computing system comprising one or more processors, one or more prompts comprising requests for information associated with resource allocation instructions for distribution of resources. The one or more prompts can be based on one or more resource documents associated with the resources. The one or more resource documents can comprise one or more resource document fields. The resource allocation instructions can be associated with distribution of one or more assets of the resources to one or more entities comprising one or more resource recipients. The computer-implemented method can comprise receiving, by the computing system, one or more responses to the one or more prompts. The computer-implemented method can comprise generating, by the computing system, based on one or more responses and rule data comprising one or more rules associated with the resources, resource data comprising one or more resource data fields and one or more resource data field values that correspond to the one or more resource data fields. The one or more resource data fields can be based on the one or more resource document fields. The one or more resource data field values can be based on the one or more responses. The computer-implemented method can comprise generating, by the computing system, based on the resource data, one or more indications associated with the resource allocation instructions. The one or more indications can comprise one or more visualizations of the distribution of the one or more assets to the one or more resource recipients.

Another example aspect of the present disclosure is directed to a computing system including: one or more processors; and one or more non-transitory computer-readable media storing instructions that when executed by the one or more processors cause the one or more processors to perform operations. The operations can comprise generating one or more prompts comprising requests for information associated with resource allocation instructions for distribution of resources. The one or more prompts can be based on one or more resource documents associated with the resources. The one or more resource documents can comprise one or more resource document fields. The resource allocation instructions can be associated with distribution of one or more assets of the resources to one or more entities comprising one or more resource recipients. The operations can comprise receiving one or more responses to the one or more prompts. The operations can comprise generating, based on one or more responses and rule data comprising one or more rules associated with the resources, resource data comprising one or more resource data fields and one or more resource data field values that correspond to the one or more resource data fields. The one or more resource data fields can be based on the one or more resource document fields. The one or more resource data field values can be based on the one or more responses. The operations can comprise generating, based on the resource data, one or more indications associated with the resource allocation instructions. The one or more indications can comprise one or more visualizations of the distribution of the one or more assets to the one or more resource recipients.

Another example aspect of the present disclosure is directed to one or more tangible non-transitory computer-readable media that collectively store instructions that when executed by one or more processors cause the one or more processors to perform operations. The operations can comprise generating one or more prompts comprising requests for information associated with resource allocation instructions for distribution of resources. The one or more prompts can be based on one or more resource documents associated with the resources. The one or more resource documents can comprise one or more resource document fields. The resource allocation instructions can be associated with distribution of one or more assets of the resources to one or more entities comprising one or more resource recipients. The operations can comprise receiving one or more responses to the one or more prompts. The operations can comprise generating, based on one or more responses and rule data comprising one or more rules associated with the resources, resource data comprising one or more resource data fields and one or more resource data field values that correspond to the one or more resource data fields. The one or more resource data fields can be based on the one or more resource document fields. The one or more resource data field values can be based on the one or more responses. The operations can comprise generating, based on the resource data, one or more indications associated with the resource allocation instructions. The one or more indications can comprise one or more visualizations of the distribution of the one or more assets to the one or more resource recipients.

Other aspects of the present disclosure are directed to various systems, apparatuses, non-transitory computer-readable media, user interfaces, and devices for resource processing and allocation. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
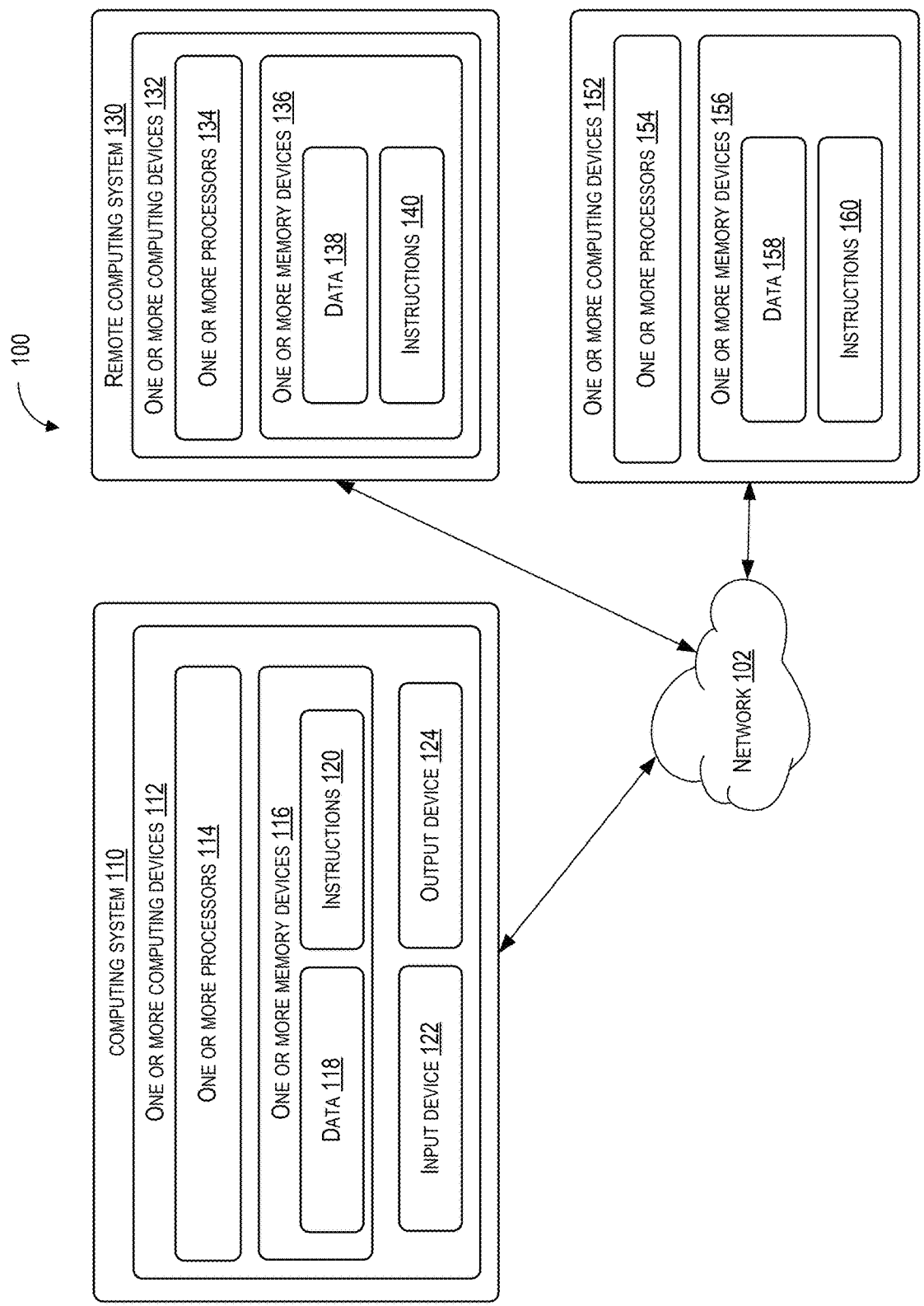
FIG. 1 depicts a block diagram of an example environment including a computing system that performs operations, according to example embodiments of the present disclosure.

Reference numerals that are repeated across plural figures are intended to identify the same features in various implementations.

DETAILED DESCRIPTION

In general, the present disclosure is directed to generating and processing data including resource data associated with resource processing and allocation. In accordance with this disclosure, a personalized analysis of resource allocation instructions including data relating to the assets and entities associated with the resources can be generated and used to automatically deal with various aspects of resources planning. Further, the resource data that is generated can be based on resource allocation instructions of an entity associated with the resources (e.g., a network administrator, a computing systems architect, and/or an asset administrator) and can include information associated with assets of the resources and the distribution of those assets to other entities including resource recipients of the resources. In some embodiments, the disclosed technology can receive information from various sources and generate resource data that can be used to generate indications including visualizations of different aspects of the resources. The disclosed technology can also implement machine-learning models that have been configured and/or trained to generate various projections (e.g., asset valuation projections) or predictions that can be used to improve resource processing and allocation.

Additionally, the present disclosure is directed to improved computer systems, computer applications, computer-implemented methods, user interfaces, and/or services for resource processing and/or allocation. In some instances, the resource allocation systems and methods described herein can be used to structure and visualize an existing resources plan, strategize potential opportunities, offer online document creation, and create a collaborative online space for accessing current resources plans and documents. Further, the systems and methods described herein can account for complex fact patterns, multiple types of trust documents, state, and federal tax laws, and have a robust reporting engine.

As used herein, the terms "user," "advisor," "wealth advisor," "financial planner," and/or "resources strategist" can each refer to the corresponding term itself individually, or one or more terms from the list of terms collectively. Further, the term "document" may include electronic documents and/or computer based documents (e.g., files stored on a storage device of a computing system).

In some instances, the disclosed technology can provide greater visibility into a user's resources allocation instructions and activities. This can provide resource advisors with real-time updates on the status of resource documents, reports, and/or tasks. In some instances, a resource data generation flow in which clients respond to prompts can make it easier for advisors to add resource documents into the platform and perform an initial assessment of resource allocation instructions. Further, by gathering basic information through an onboarding process, the system can be configured to identify opportunities that are specifically tailored to the resources. Further, advisors can receive notifications based on existing planning, changes in law, or changes in life circumstances that prompt them to check-in on the resources. Furthermore, the disclosed technology can be easy to use, integrated with other financial technology systems, and secure.

For example, a computing system can generate one or more prompts that are associated with requests for information associated with resource allocation instructions for distribution of resources. The computing system can generate a variety of prompts associated with various aspects of processing resources and/or allocating resources. The prompts can take the form of questions that can be used to direct a user to enter responses that can be used to generate resource data that is then processed and used to provide information, updates, and notifications to a user. For example, one or more prompts can be generated via a user interface that is displayed on a display device associated with the computing system. The one or more prompts can be based on one or more resource documents associated with the resources. For example, the one or more resource documents on which the one or more prompts are based can comprise a network policy, authentication policy, legal documents, estate documents, a will, deeds to property, beneficiary designations, a power of attorney, insurance policy, healthcare directives, and/or other types of documents that are associated with resources. Further, the one or more resource documents can comprise one or more resource document fields. For example, the document fields can comprise fields associated with the name of a resource recipient or the amount of an asset that may be distributed to a resource recipient. Further, the document fields can be associated with corresponding document field values that can be assigned based on the responses to the one or more prompts.

The computing system can receive responses to the prompts. For example, the computing system can receive responses to the prompts including the prompt requesting the name of a resource recipient which can be associated with a resource recipient field. The resource recipient field value associated with the resource recipient field can then be assigned a value based on the response to the prompt associated with the resource recipient field. The computing system can generate resource data that is based on one or more responses and rule data that includes one or more rules associated with the resources (e.g., access rules and/or permissions). The resource data can include resource data fields and resource data field values that correspond to the resource data fields. The resource data fields can be based on the one or more resource document fields. Further, the resource data field values can be based on the responses. For example, the resource data field for a resource recipient's name can correspond to the document data field for the resource recipient's name. Further, the resource data field value for the resource recipient's name can correspond to the response to the prompt requesting the resource recipient's name.

The computing system can generate indications that can include visualizations of the distribution of the one or more assets to the one or more resource recipients. The indications can be based on the resource data. For example, based on resource data that indicates the specific assets (e.g., computing devices, documents, houses, vehicles, securities, and/or cash) to be distributed to various resource recipients, the computing system can generate visualizations that indicate which resource recipients receive which assets and the amounts of the assets that each of the resource recipients receives.

Accordingly, the disclosed technology can generate resource data and visualizations of the resource data that are based on specific user responses to prompts associated with resources. Further, the disclosed technology can assist a user in more effectively performing the technical task of resource data processing by means of a continued and/or guided human-machine interaction process in which responses to generated prompts based on resource documents are received and the disclosed technology generates real-time visualizations based on continuously updated resource data. The disclosed technology can allow for the generation of personalized resource data provision that can more effectively address a user's questions.

In some embodiments, the disclosed technology can comprise a computing system (e.g., a resource data processing computing system) that can comprise one or more computing devices (e.g., devices with one or more computer processors and a memory that can store one or more instructions) that can process, send, receive, generate, and/or modify data (e.g., data associated with processing resources and/or resource allocation). The computing system can communicate (e.g., send and/or receive data) with various other systems and/or devices (e.g., one or more remote computing systems) that can send and/or receive data associated with resources. In some embodiments, the computing system can comprise one or more features of the computing system 110 that is described with respect to FIG. 1 and/or the computing device 200 that is described with respect to FIG. 2. Further, the computing system can comprise and/or be associated with one or more machine-learning models that include one or more features of the one or more machine-learning models 304 that are described with respect to FIG. 3.

A computing system can generate one or more prompts. The computing system can generate one or more prompts that are displayed in an interface (e.g., a graphical user interface) of a display component associated with the computing system. In some embodiments, the one or more prompts can be generated via an audio output device (e.g., loudspeakers) associated with the computing system.

The one or more prompts can be associated with requests for information. The one or more prompts can comprise one or more questions that can be configured to receive one or more response types. The one or more response types can comprise open-ended answers, selecting from a list of responses, fill-in the blank responses, and/or true or false responses. In some embodiments, the one or more responses can be based on selection of a numerical value, numerical value range, calendar date value, and/or calendar date value range.

For example, the computing system can generate one or more prompts in the form of questions on a display device and/or audible prompts that can use synthetic speech and/or pre-recorded speech to request the information. Further, the information can be associated with resource allocation instructions for distribution of resources. For example, the one or more prompts can comprise requests for information of an entity comprising a person (e.g., a name, date of birth, address, and/or contact information of a person), a device (e.g., the software, processor, storage, and/or memory configuration of a computing device), and/or an organization (e.g., the name of the organization, the geographic location in which the organization is registered and/or incorporated). Further, the one or more prompts can comprise requests for information associated with one or more assets. For example, the one or more prompts can comprise a request for information about the state, address, estimated value, and owner of an asset comprising real property.

The one or more assets can comprise one or more computing devices (e.g., one or more laptop computing devices, smartphones, and/or desktop computing devices), one or more software assets (e.g., one or more software applications and/or access to one or more software applications), real property, tangible personal property (e.g., vehicles, books, furniture, jewelry, clothing, personal electronics, and/or sporting equipment), one or more securities (e.g., stocks, treasury bills, and/or bonds), intangible property (e.g., intellectual property including patents, copyrights, and/or trademarks), and/or cash. For example, the one or more prompts can comprise requests for information about the ownership of one or more assets, whether the assets are subject to taxes or fees, where assets are located, the monetary value of assets (e.g., an estimated or appraised value of an asset), and/or one or more resource recipients associated with one or more assets. In some embodiments, the one or more resource recipients can comprise one or more users (e.g., user of computing software, computing services, and/or computing devices), one or more computing devices (e.g., one or more computing devices that use network resources, processing resources, and/or storage resources), one or more trustees (e.g., one or more trustees of an estate), and/or one or more beneficiaries (e.g., one or more beneficiaries of a will).

The one or more prompts can be generated based on one or more resource documents associated with the resources. For example, the one or more prompts can be based on performance of one or more optical character recognition operations on one or more resource documents. Further, the one or more resource documents can be inputted into one or more machine-learning models that are configured and/or trained to generate the one or more prompts based on the one or more resource documents. The one or more machine-learning models can be configured and/or trained to generate the one or more prompts based on recognition of textual and/or semantic features of the one or more resource documents. For example, the one or more machine-learning models can recognize portions of the one or more resource documents that are associated with one or more entities, one or more assets, and/or one or more rules (e.g., computing device policies, network policies, clauses of a will, insurance policy provisions, laws, and/or bank account policies) associated with distributing the one or more assets to the one or more entities.

The one or more resource documents can comprise one or more documents associated with the resources and/or the resource allocation instructions. Further, the one or more resource documents may include one or more rules and/or one or more references to rules that can be used to determine the ownership and/or distribution of the one or more assets. The one or more resource documents can comprise one or more network policies, one or more user guides, one or more access policies, one or more authorization policies, one or more authentication policies, one or more estate documents, one or more wills, one or more trusts, a power of attorney, one or more titles, one or more deeds, one or more account resource recipient designations, one or more guardianship designations, one or more insurance policies, and/or one or more healthcare directives.

The one or more resource documents can comprise one or more resource document fields. Further, the resource document fields can be associated with one or more entities and/or one or more assets. For example, the one or more resource document fields can comprise a document field associated with the name of a resource recipient and/or a document field associated with the address of real property, a network address (e.g., IP address), and/or the name of tangible personal property comprising a piece of artwork (e.g., a painting or sculpture). In some embodiments, the one or more resource document fields can comprise one or more estate document fields associated with an estate and/or an estate plan (e.g., resource allocation instructions to distribute assets of an estate). Further, the one or more estate document fields can be associated with one or more estate document values that may correspond to the one or more estate document fields.

Further, the resource allocation instructions can be associated with the distribution of one or more assets of the resources to one or more entities. The resource allocation instructions can indicate the one or more entities that are associated with receiving (e.g., resource recipients) the one or more assets and/or managing (e.g., a network administrator, an executor, and/or resource manager) one or more assets of the resources. The one or more entities can comprise one or more resource recipients, one or more network administrators, one or more users (e.g., computer users), one or more beneficiaries, one or more managers, one or more trustees of the resources, one or more employees, one or more testators, and/or one or more creditors.

The computing system can receive one or more responses to the one or more prompts. Further, as part of receiving the one or more responses, the computing system can implement an interface that is configured to detect and/or receive the one or more responses to the one or more prompts. For example, the computing system can implement a graphical user interface that is configured to be displayed on a display component associated with the computing system and receive the one or more responses via one or more inputs (e.g., entering text) provided via one or more input devices (e.g., a touchscreen, a mouse, a keyboard, microphone, stylus, and/or a numeric input pad).

The computing system can generate resource data. Generating the resource data can be based on one or more responses and/or rule data. The rule data can comprise one or more rules associated with the resources. In some embodiments, the one or more rules can be based on one or more regulations associated with the resources. The one or more rules can be associated with the regulation of computing systems and/or one or more assets associated with computing systems. For example, the one or more rules can be associated with one or more access policies, one or more authorization policies, one or more authentication policies, one or more computing device permissions, one or more file access permissions, and/or assignment of one or more assets (e.g., computing devices) to one or more entities (e.g., computing device users). Further, the one or more rules can be associated with one or more laws (e.g., one or more federal laws and/or one or more state laws) that can be associated with various aspects of the resources including probate law, resources law, tax law, inheritance law, and/or property law. Further, the one or more rules can be based on one or more provisions of the one or more resource documents (e.g., network policy documents, estate documents, an estate plan, provisions of a will, trust, healthcare directive, power of attorney, and/or insurance policy).

The resource data can comprise one or more resource data fields and/or one or more resource data field values. For example, a resource date field can be associated with an asset (e.g., a house) and the resource data field value can be associated with an appraised value of the house (e.g., $750,000.00). The one or more resource data field values can correspond to the one or more resource data fields. For example, the resource data field value that indicates the maturity date of a debt instrument can correspond to the resource data field associated with a debt instrument. The one or more resource data fields can be based on the one or more resource document fields. For example, the resources document field associated with the name of an asset indicated in a resource document can correspond to the name of the asset indicated in the resource data field in the resource data. The one or more resource data field values can be based on the one or more responses. For example, if a response to a prompt requesting information about the intended resource recipient of an asset is a particular name (e.g., "JOHN DOE"), the one or more resource data field value associated with the name of the intended resource recipient may match the response (e.g., the resource data field can indicate "JOHN DOE"). In some embodiments, the resource data can comprise estate data. The estate data can be associated with an estate plan (e.g., resource allocation instructions for an estate) associated with distribution of one or more assets of an estate (e.g., an estate comprising one or more assets that were previously the property of one or more entities) to one or more entities (e.g., one or more beneficiaries of the estate).

The computing system can generate one or more indications. Further, the one or more indications can be associated with the resource data and/or the resource allocation instructions. For example, the computing system can generate an interface (e.g., a graphical user interface) comprising one or more regions in which the one or more indications associated with the resource data and/or resource allocation instructions are displayed and/or comprising an interface element that can cause the computing system to generate information associated with one or more assets and/or one or more entities based on detecting one or more inputs to the interface.

The one or more indications can comprise text, numerical values, images, and/or symbols (e.g., graphs and/or charts) associated with the resource data. For example, the one or more indications can comprise identifiers and/or values associated with one or more assets (e.g., locations of assets, expected appreciation or depreciation values of assets, and/or the owners of assets), biographical information associated with one or more entities, and/or one or more identities of the one or more entities (e.g., one or more resource recipients that can include a network administrator, systems architect, testator, beneficiary, executor, trustee, administrator, asset manager, and/or resource manager).

In some embodiments, the one or more indications can comprise one or more interactive indications that can provide additional information about one or more portions of resource data based on detection of one or more inputs. For example, an asset indication associated with an asset can be configured to show the name of an asset by default and additional information about the asset such as the value and location of the asset based on detection of an input to the asset indication.

The one or more indications can comprise one or more visualizations of the distribution of the one or more assets to the one or more resource recipients. For example, the one or more visualizations of the distribution of the one or more assets to the one or more resource recipients can comprise a chart that indicates the names of the one or more resource recipients and the assets associated with each resource recipient. Further, the one or more visualizations can be updated in real-time or near real-time based on changes in the values of the one or more assets and/or the one or more resource recipients (e.g., resource recipients that are added or removed).

The computing system can receive and/or retrieve an asset valuation request associated with a projected asset valuation of one or more assets. The asset valuation request can comprise an indication of the asset and/or a time and/or date (e.g., a date sometime in the future) associated with the projected valuation. For example, the asset valuation request can comprise a request to determine the projected value of an asset comprising a computing device at a date two years in the future and/or the projected value of a classic automobile at a date ten years in the future.

The computing system can determine the projected asset valuation of one or more assets. Determining the projected asset valuation can be based on the resource data. In some embodiments, the one or more indications associated with the resource allocation instructions can comprise the projected asset valuation of the one or more assets. For example, the computing system can access information associated with an estimated appreciation and/or depreciation rate of the selected asset (e.g., the appreciation rate or depreciation rate of real property in the geographical location surrounding the selected asset) and determining the projected asset valuation based on applying the estimated appreciation rate and/or depreciation rate to the current value of the selected asset. Further, the computing system can use one or more statistical techniques (e.g., linear regression) to determine the one or more projected asset valuations.

The projected asset valuation can be based on inputting input data comprising the resource data and/or financial data into one or more machine-learning models (e.g., one or more machine-learning asset projection models) that can be configured and/or trained to generate the projected asset valuation. The financial data can comprise one or more predicted asset appreciation rates, a predicted inflation rate, and/or one or more asset depreciation rates. In some embodiments, the input data can comprise information associated with the selected time in the future and resource data identifying the selected asset and comprising the selected value of the selected asset. The one or more machine-learning models can be configured and/or trained based on training data that can comprise historical data associated with the values of various assets over time (e.g., the values of real property, automobiles, and/or works of art).

The computing system can receive and/or retrieve an asset distribution request associated with a projected asset distribution of the one or more assets to the one or more entities. The asset distribution request can comprise an indication of the one or more entities and/or the date (e.g., a date in the future) associated with the projected asset distribution. For example, the projected asset distribution request can comprise a request to determine the projected asset distribution of the assets of the resources to all of the resource recipients of the resources. Further, the projected asset distribution can be based in part on determining one or more taxes and/or one or more fees associated with the one or more assets. The one or more fees and/or one or more taxes can change the one or more assets that are distributed to the one or more entities.

The computing system can determine one or more relationships between the one or more entities. Determining the one or more relationships can be based on the resource data. For example, the computing system can determine one or more entities that can receive the one or more assets if one or more entities is no longer entitled to one or more assets. Further, the one or more relationships can comprise the next of kin of the one or more entities.

The computing system can determine a plurality of projected asset distributions of the one or more assets to the one or more entities. Determining the plurality of projected asset distributions can be based on the resource data and/or the one or more relationships between the one or more entities. For example, the computing system can determine the ages of computing devices and a time that the computing devices have been assigned to one or more resource recipients (e.g., users of the computing devices). Based on the ages of the computing devices and/or the time the computing devices have been assigned to the one or more resource recipients the computing system can determine a projected asset distribution based on a projected amount of time that the computing devices were allocated to the one or more resource recipients. By way of further example, the computing system can determine ages of a testator and one or more resource recipients. Based on the ages of the testator and/or the one or more resource recipients, the computing system can determine a projected asset distribution based on the ages of the one or more resource recipients at some time in the future. For example, at the future date, an asset distribution may exclude certain intended resource recipients from receiving an asset based on the intended resource recipients being below the age of majority and/or a minimum age established in a trust. At a later date on which the intended resource recipients reach the age of majority, the projected asset distribution may change to include the intended resource recipients.

For example, the computing system can, based on the resource data, determine one or more types of the one or more assets and determine that the one or more assets comprise real property that is designated to be a life estate. Based on the determination of estimated life expectancies of the one or more resource recipients, the computing system can determine projected asset distributions in which one or more resource recipients receive the life resources.

In some embodiments, the one or more indications associated with the resource allocation instructions can comprise the plurality of projected asset distributions of the one or more assets to the one or more entities. For example, the computing system can generate an interface (e.g., a graphical user interface) comprising a region in which the plurality of projected asset distributions are displayed and/or comprising an interface element that can cause the computing system to generate the plurality of projected asset distributions.

The projected asset distribution can be generated based on inputting input data comprising the resource data and/or relationship data associated with the one or more relationships into one or more machine-learning models (e.g., one or more machine-learning distribution projection models) that can be configured and/or trained to generate the projected asset distribution. The input data can comprise information associated with the selected time in the future and resource data identifying the plurality of resource recipients and the plurality of assets associated with the plurality of resource recipients.

The one or more machine-learning models can be configured and/or trained based on training data that can comprise historical data associated with a predicted time before failure of computing devices and/or life expectancies of various entities over time. For example, if a resource recipient is significantly older than a testator the historical life expectancy data can be used to determine the probability that the resource recipient may receive an asset. By way of further example, if a resource recipient is significantly older than a testator the historical life expectancy data can be used to determine the probability that the resource recipient may receive an asset. Further, the one or more relationships between the plurality of resource recipients may be used to determine that an intended resource recipient may not be alive to receive an asset at the projected time in the future and that a next of kin (e.g., a child) of the resource recipient will be the actual resource recipient and receive the asset.

The computing system can receive one or more conditions. The one or more conditions can be associated with the one or more entities and/or the one or more assets. The one or more conditions can comprise a possible life expectancy of the one or more entities, a possible appreciation rate of an asset, a possible depreciation rate of an asset, and/or a possible valuation of the one or more assets. In some embodiments, the one or more conditions can be received via an interface that is configured to receive one or more inputs associated with the one or more conditions.

The computing system can determine one or more scenarios associated with the one or more conditions. The one or more scenarios can comprise one or more projected valuations of the one or more assets and/or one or more predicted distributions of the one or more assets to the one or more resource recipients. The computing system can perform one or more operations based on use of one or more algorithms that receive a plurality of parameters comprising one or more condition parameters associated with the one or more conditions as inputs. In some embodiments, the one or more indications associated with the resource allocation instructions can comprise the one or more scenarios associated with the one or more conditions.

In some embodiments, determining the one or more scenarios can be based on inputting the resource data and the one or more conditions into one or more machine-learning scenario models that are configured and/or trained to generate the one or more scenarios. The one or more machine-learning models can be configured and/or trained based on training data comprising historical trends associated with various conditions (e.g., fluctuations in asset values over the various time intervals including six months, one year, two years, and three to ten years).

The computing system can receive and/or retrieve event data. The event data can comprise information associated with a plurality of events associated with the resources. For example, information associated with the purchase of a new asset to be added to the resources (e.g., a house purchase) can be sent to the computing system from the party that purchased the house. The computing system can receive event data from one or more remote computing devices that are configured to communicate with the computing system via a network. In some embodiments, the computing system can retrieve (e.g., retrieve periodically and/or based on an event data retrieval request) the event data from one or more remote computing devices.

In some embodiments, the resource data can comprise one or more portions of the event data. For example, the resource data can comprise event data associated with the date of birth of a child of a resource recipient. Based on the resource data indicating that children of resource recipients can become resource recipients upon reaching the age of majority, the distribution of the one or more assets of the resources can be changed to include the child of the resource recipient as a resource recipient.

The computing system can determine whether one or more events of the plurality of events satisfy one or more event criteria. The computing system can compare the one or more events to the one or more event criteria to determine if the events are in the class of events in the one or more event criteria. For example, the computing system can determine that a marriage event is in the class of events in the one or more event criteria and that a marriage engagement event is not in the class of events in the one or more event criteria. Based on the event data comprising an event that is in the class of the one or more event criteria, the event can be determined to satisfy the one or more event criteria. In some embodiments, the computing system can further process the event data and determine whether the one or more event criteria are satisfied based on whether the event satisfies an event threshold. For example, the purchase of an asset that has a value that is less than an event threshold amount may not satisfy the one or more event criteria and the purchase of an asset that has a value that is greater than the event threshold amount may satisfy the one or more event criteria. In some embodiments, one or more portions of the resource data can be used to determine whether the one or more events satisfy the one or more event criteria.

The computing system can generate one or more event notifications associated with the one or more events that satisfy the one or more event criteria. For example, in response to receiving event data indicating that a marriage of a resource recipient has occurred, the computing system can update the resource data to indicate the marital status of the resource recipient. Further, the computing system can generate a notification that can comprise information associated with the date of the marriage, the name of the resource recipient's spouse, and/or the location at which the marriage took place. In some embodiments, the one or more indications associated with the resource allocation instructions can comprise the one or more event notifications.

The computing system can send the one or more event notifications to one or more remote computing devices. The one or more remote computing devices can comprise one or more computing devices that are associated with an entity that is authorized to receive the one or more event notifications. For example, the computing system can send one or more event notifications to a computing device (e.g., a laptop computing device) of an attorney that is authorized to receive the one or more event notifications.

The plurality of events can comprise marriage, university graduation, high-school graduation, divorce, receipt of a new asset (e.g., purchase of real property or a vehicle including an automobile, airplane, or boat), birth of a child, and/or death of at least one of the one or more entities (e.g., death of a resource recipient). In some embodiments, the plurality of events can comprise the change in the value of an asset that exceeds some value threshold. For example, if the value of an asset increases by a dollar amount or a proportional amount (e.g., a 20% increase in the value of an asset or a 30% decrease in the value of an asset), the change in the asset value can be determined to be an event that satisfies the one or more event criteria.

Generating the resource data can comprise determining one or more locations associated with the one or more assets. In some embodiments, the computing system can determine the one or more locations based on the one or more responses to the one or more prompts (e.g., one or more responses to prompts requesting the location associated with an asset). Further, the computing system can determine the one or more locations associated with the one or more assets based on information from the resource documents. For example, the resource documents can indicate the state in which a vehicle is registered and/or the address of real property. In some embodiments, the one or more locations can comprise virtual locations and/or computing device addresses (e.g., IP addresses).

The one or more locations can comprise one or more administrative divisions and/or one or more organizations. The one or more administrative divisions can comprise nation states (e.g., Canada), states (e.g., Illinois, United States), provinces (e.g., Ontario, Canada), cities (e.g., Chicago), and/or counties (e.g., Cook County, Illinois). The one or more organizations can comprise financial institutions (e.g., a bank), a charity, and/or a trust.

Further, generating the resource data can comprise determining the one or more rules associated with the one or more locations. For example, the computing system can access one or more databases that include information associated with the one or more rules of one or more locations. The one or more databases can comprise locally stored and/or online accessible (e.g., accessible via the Internet) databases.

The computing system can receive and/or retrieve data associated with one or more modifications of the one or more regulations. The computing system can receive data associated with one or more modifications of the one or more regulations from one or more remote computing devices that are configured to communicate with the computing system via a network. For example, data retrieved from a court of law web server can comprise information associated with the imminent passage of a new law that could affect the value of assets associated with resources.

The computing system can modify the rule data based on the data associated with one or more modifications of the one or more regulations. For example, if the data associated with one or more modifications of the one or more regulations indicates that inheritance laws that determine the minimum allocation of assets associated with resources to a surviving spouse have changed, the intended distribution of assets to resource recipients can be adjusted based on the change in the inheritance laws.

The computing system can generate one or more rule modification notifications associated with one or more modifications of the one or more regulations. For example, in response to receiving data associated with one or more modifications of the one or more regulations that indicates that a law or policy has been modified, the computing system can generate a notification comprising information that identifies the law and/or policy that was modified, the region in which the law and/or policy is applicable, and/or the date on which the law and/or policy will come into effect. In some embodiments, the one or more indications associated with the resource allocation instructions can comprise the one or more rule modification notifications.

The computing system can send the one or more rule modification notifications to one or more remote computing devices associated with an entity authorized to receive the one or more rule modification notifications. For example, the computing system can send one or more rule modification notifications to a computing device (e.g., a smartphone) of a resource manager that is authorized to receive the one or more rule modification notifications.

The systems, methods, devices, computer-readable media (e.g., tangible non-transitory computer-readable media) in the disclosed technology can provide a variety of technical effects and benefits including an improvement in the generation of resource data that can be used in the analysis and implementation of resource allocation instructions. Further, the resource data can be personalized based on information specific to each individual entity associated with the resource allocation instructions. The disclosed technology can provide the technical effect of improving the effectiveness with which resources planning tasks are performed. For example, the computing system can be continuously updated based on user responses to prompts, changes in rules that govern resources, and/or the occurrence of key events that may change the way in which the assets associated with resources are distributed. In some embodiments, machine-learning models can be used in the process of generating personalized resource data. Further, the machine-learning models can be continuously trained and/or updated in response to updated resource data that is specific to the resources and/or resources plan. As a result, more relevant and timely resource data can be provided to a user based on specific information associated with that particular user's resource data. Further, the disclosed technology can generate visualizations that can include projected asset valuations and/or asset distributions that can be used to plan different scenarios associated with resources.

The disclosed technology can improve the operation of a resource processing device by more effectively performing a variety of tasks with the specific benefits of providing more accurate resources planning information. Further, the disclosed technology can use various rules-based techniques and/or machine-learning models to more efficiently process resource documents that would otherwise require time consuming and burdensome manual review and handling. Accordingly, the improvements offered by the disclosed technology can result in tangible benefits to a variety of devices and/or systems comprising computing systems, electronic systems, and/or mechanical systems associated with processing resource data.

With reference to the Figures, example embodiments of the present disclosure will be discussed in further detail. FIG. 1 depicts a block diagram of an example environment including a computing system that performs operations according to example embodiments of the present disclosure. An environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., the one or more computing devices 152) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes one or more computing devices 112. The one or more computing devices 112 can include any type of computing device. For example, the one or more computing devices 112 can include a personal computing device (e.g., a desktop computing device), a mobile computing device (e.g., a smartphone or tablet device), a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, a FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/ or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include accessing resources planning data.

The data 118 can include resources planning data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with processing and/or allocating resources. Further, the computing system 110 may be associated with processing and/or allocating and may be configured to manage one or more applications.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations based at least in part on the one or more inputs.

The remote computing system 130 includes one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102. In some embodiments, the remote computing system 130 can include one or more applications (e.g., computer software applications comprising computer instructions) that can be stored and/or executed by the remote computing system 130.

One or more computing devices 152 (e.g., user devices or any other types of devices) can include one or more processors 154, one or more memory devices 156, the data 158, and/or the instructions 160. The one or more computing devices 152 may include any of the attributes and/or capabilities of the one or more computing devices 112, and/or the one or more computing devices 132. Further, the one or more computing devices 152 can communicate with one or more devices and/or one or more systems via the network 102. In some embodiments, the one or more computing devices 152 can include one or more applications (e.g., computer software applications comprising computer instructions) that can be stored and/or executed by the one or more computing devices 152.

Figure 2:
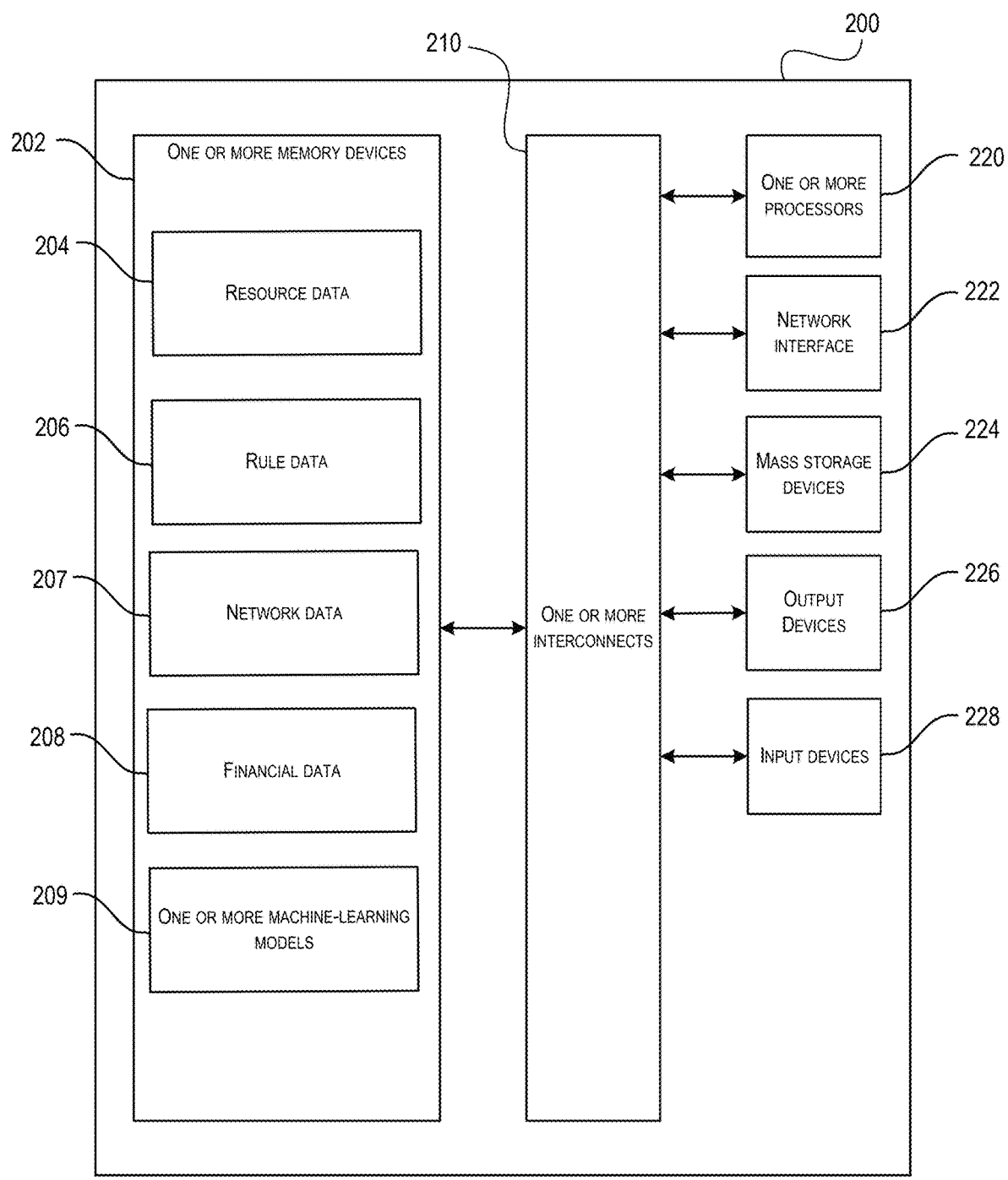
FIG. 2 depicts a block diagram of an example of a computing device, according to example embodiments of the present disclosure.

FIG. 2 depicts a block diagram of an example of a computing device according to example embodiments of the present disclosure. A computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, including resource data 204, rule data 206, network data 207, financial data 208, one or more machine-learning models 209, one or more interconnects 214, one or more processors 220, a network interface 222, one or more mass storage devices 224, one or more output devices 226, and/or one or more input devices 228.

The one or more memory devices 202 can store information and/or data (e.g., resource data 204, and/or any other types of data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations described herein. The resource data 204, the rule data 206, the financial data 208, the one or more machine-learning models 209, and/or other data stored in the one or more memory devices 202 can be encrypted for added security.

The resource data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The resource data 204 also can include information associated with one or more resources records, one or more entities (e.g., resource recipients, trustees, and/or executors), and/or one or more assets associated with the resources. For example, the resource data 204 can include resources planning data obtained from one or more clients.

The rule data 206 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The rule data 206 can include information associated with one or more rules, one or more policies, and/or one or more regulations that can be associated with resource allocation instructions. For example, the rule data 206 can include one or more rules that determine the way in which assets associated with resources are distributed to resource recipients.

The network data 207 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The network data 207 can include information associated with one or more network devices (e.g., computing devices of a network, routers, and/or switches) that can be associated with resource allocation instructions. For example, the network data 207 can include information associated with network architecture that can be used to determine the way in which assets and/or instructions associated with network resources are distributed to resource recipients.

The financial data 208 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. Further, the financial data 208 can include information associated with one or more predicted appreciation rates, predicted depreciation rates, rates of inflation, and/or historical financial records including one or more financial records associated with one or more assets.

In some implementations, the computing device 200 can store the one or more machine-learning models 209 that can include one or more resources planning-specific models. In some embodiments, the one or more machine-learning model can include a model that is specifically associated with resources planning.

For example, the one or more machine-learning models 209 can be or can otherwise include various machine-learning models such as neural networks (e.g., deep neural networks) or other types of machine-learning models, including non-linear models and/or linear models. Neural networks can include feed-forward neural networks, recurrent neural networks (e.g., long short-term memory recurrent neural networks), convolutional neural networks or other forms of neural networks. Some example machine-learning models can leverage an attention mechanism such as self-attention. For example, some example machine-learning models can include multi-headed self-attention models (e.g., transformer models).

In some implementations, the input to the one or more machine-learning models 209 (e.g., machine-learning models) of the present disclosure can be statistical data. Statistical data can be, represent, or otherwise include data computed and/or calculated from some other data source. The one or more machine-learning models 209 can process the statistical data to generate an output. As an example, the one or more machine-learning models 209 can process the statistical data to generate a threshold value for a metric. As another example, the one or more machine-learning models 209 can process the statistical data to generate a prediction output.

The one or more interconnects 214 can include one or more interconnects or buses that can be used to send and/or receive one or more signals (e.g., electronic signals) and/or data (e.g., resource data 204 and/or any other data) between components of the computing device 200, including the one or more memory devices 202, the one or more processors 220, the network interface 222, the one or more mass storage devices 224, the one or more output devices 226, and/or the one or more input devices 230. The one or more interconnects 214 can be arranged or configured in different ways. For example, the one or more interconnects 214 can be configured as parallel or serial connections. Further the one or more interconnects 214 can include one or more internal buses that are used to connect the internal components of the computing device 200 and one or more external buses used to connect the internal components of the computing device 200 to one or more external devices. By way of example, the one or more interconnects 214 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the resource data 204 and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the resource data 204 and one or more machine-learning models 209, and/or any other data. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more input devices 228 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200). Further, the one or more input devices 228 can be used to provide input (e.g., a response to a prompt associated with resource data) that can be used as part of invoking or performing one or more operations. For example, the one or more input devices 228 can receive one or more inputs from a user (e.g., a resource advisor, wealth advisor, financial planner, and/or resource strategist) associated with entering data in response to one or more prompts associated with resource data and generated by the computing device 200.

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more resources planning applications and/or one or more third-party applications) that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

Figure 3:
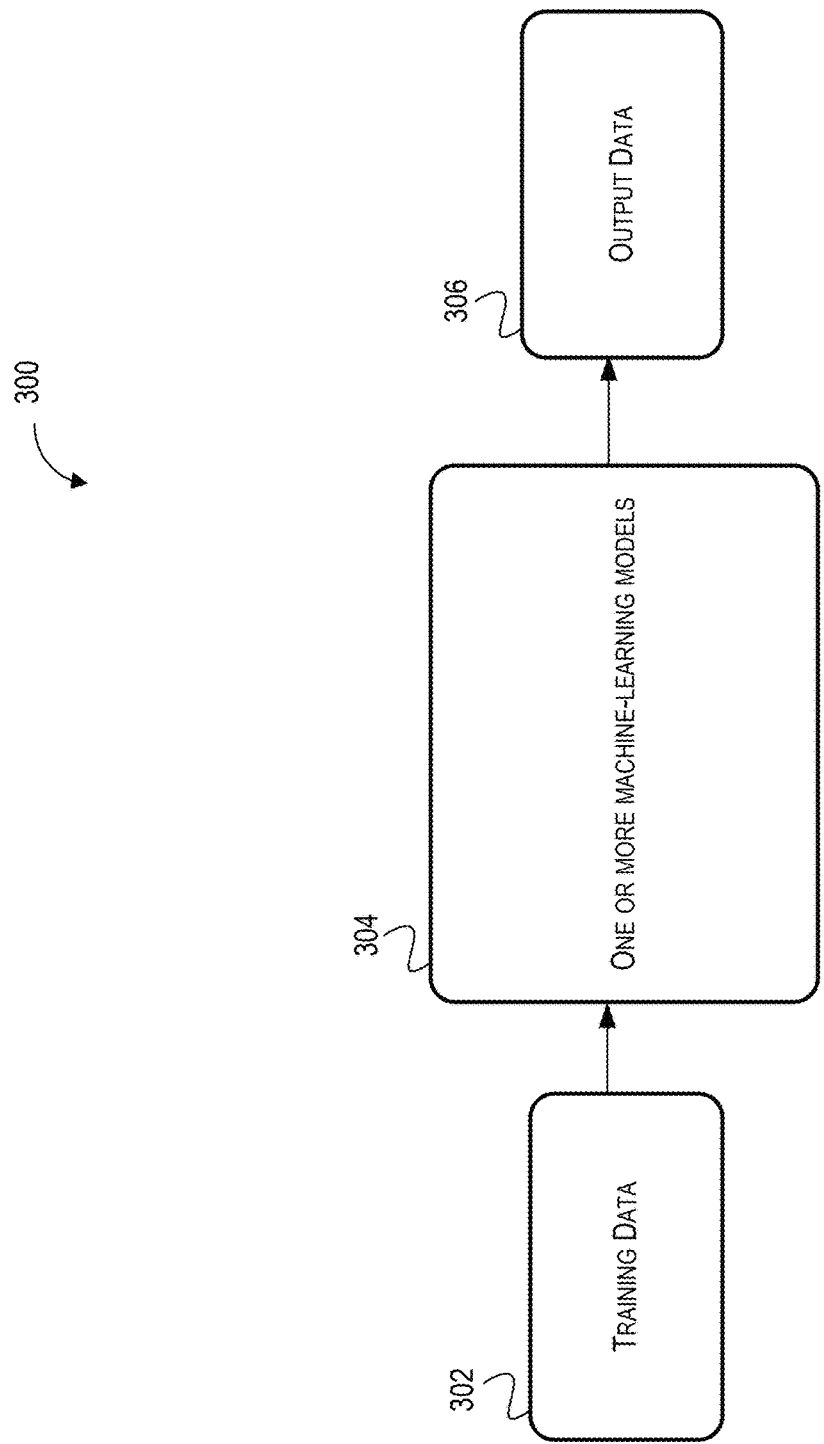
FIG. 3 depicts a diagram of an example machine-learning model according to example embodiments of the present disclosure.

FIG. 3 depicts a diagram of an example machine-learning model according to example embodiments of the present disclosure. The machine-learning model described with respect to FIG. 3 can be generated, implemented, configured, and/or trained by a computing system or computing device that includes one or more features of the computing system 130, the remote computing system 130, and/or the one or more computing devices 152, which are described with respect to FIG. 1; and/or the computing device 200 that is described with respect to FIG. 2. As shown in FIG. 3, the machine-learning system 300 includes training data 302, one or more machine-learning models 304, and output 306.

The training data 302 can comprise training resource data that can comprise information associated with resources, processing resources, allocating resources, and/or generating resource allocation instructions. The training resource data can be based on historical data (e.g., data based on actual historical resources instructions and/or actual historical resources) that can comprise the historical values of assets. Further, the training data 302 can comprise training rule data that can comprise information associated with one or more rules (e.g., one or more regulations) that determine the way in which assets are treated. The training data 302 can comprise training network data that can comprise information associated with configurations of computing networks (e.g., the devices and device configurations (e.g., software, processor, memory, and/or storage configurations of computing devices) of a network). The training data 302 can comprise training estate data that can comprise information associated with training estates, training estate entities (e.g., trustees, beneficiaries, and/or testator's), training estate assets (e.g., real property, stocks, vehicles, cash, and/or tangible personal property), and/or training estate documents. Further, the training data 302 can comprise training financial data that can be based on historical financial trends and/or indicators and which can include historic interest rates, rates of inflation, and/or asset values.

The one or more machine-learning models 304 can be configured and/or trained using supervised learning, unsupervised learning, reinforcement learning, and/or semi-supervised learning. Further, the one or more machine-learning models may use one or more algorithms and/or machine-learning structures including one or more generative adversarial models (GANs), one or more large language models (LLMs), one or more generative models, one or more neural networks (e.g., convolutional neural networks), random forest, one or more decision trees, nearest neighbors, linear regression, logistic regression, K Means clustering, and/or one or more support vector machines. Additionally, the one or more machine-learning models can be configured to operate individually and/or in combination with one or more other machine-learning models of the one or more machine-learning models 304.

The one or more machine-learning models 304 can comprise one or more machine-learning asset projection models configured to generate a projected asset valuation based on input comprising resource data and/or financial data, one or more machine-learning distribution projection models configured to generate projected asset distributions based on input comprising resource data and/or relationship data, and/or one or more machine-learning scenario models configured to generate one or more scenarios based on input comprising resource data and/or one or more conditions. The one or more machine-learning asset projection models can be configured and/or trained based on training data comprising a plurality of training asset valuations, training resource data, training asset data, and a plurality of ground-truth asset valuations based on the same training resource data and training asset data. The one or more machine-learning distribution projection models can be configured and/or trained based on training data comprising training entity data, training resource data, training asset data, and a plurality of ground-truth asset distributions based on the same training resource data, training asset data, and training entity data. The one or more machine-learning scenario models can be configured and/or trained based on training data comprising a plurality of training conditions, training resource data, and a plurality of ground-truth scenarios based on the same training conditions and training resource data.

The one or more machine-learning models 304 can comprise a plurality of parameters associated with a plurality of weights that can be modified as the one or more machine-learning models 304 are configured and/or trained. Configuring and/or training the one or more machine-learning models 304 can comprise modifying the weights associated with the plurality of parameters based on how much each of the plurality of parameters contributes to increasing or decreasing the accuracy of output generated by the one or more machine-learning models 304. The accuracy of the output generated by the one or more machine-learning models 304 can be associated with error. For example, the accuracy of the output of the one or more machine-learning models 304 can be inversely correlated with the error such that higher accuracy corresponds to low error and low accuracy corresponds to high error.

For example, the one or more machine-learning models 304 can comprise a plurality of parameters corresponding to a plurality of assets associated with corresponding asset values. In the process of training the one or more machine-learning models 304, the weighting of the plurality of parameters can be modified based on the extent to which each of the plurality of parameters contributes to accurately predicting the asset values of the assets at one or more times.

For example, based on input comprising the asset values of an asset from a first calendar year the one or more machine-learning models 304 can generate predicted asset values of the asset in a second calendar year. The ground-truth asset values can comprise the actual historical asset values of the same asset in the first calendar year (which will match the asset value inputted into the one or more machine-learning models 304) and the second calendar year. The predicted asset value of the asset in the second calendar year can be compared to the actual historical value of the asset in the second calendar year and the plurality of parameters can be modified based on the differences between the predicted asset value and the ground-truth actual historical asset value. The differences between the predicted asset value and the ground-truth actual historical asset value can be associated with an error which can be based on an amount of inaccuracy of the predicted asset value. A greater inaccuracy of the predicted asset value can correspond to a higher error and a lower inaccuracy of the predicted asset value can correspond to a lower error.

Configuring and/or training the one or more machine-learning models 304 can comprise the use of a cost function that can be used to minimize the error (e.g., inaccuracy) of the output of the one or more machine-learning models 304 with respect to a set of ground truth values corresponding to accurate output. For example, the training data can comprise a plurality of asset distributions associated with a plurality of resources and resources plans. The ground-truth data may indicate values associated with actual asset distributions. Accurate output by the one or more machine-learning models 304 can comprise accurately determining the asset distributions associated with the corresponding plurality of resources and resources plans. Inaccurate output by the one or more machine-learning models 304 can comprise not accurately determining the asset distributions associated with the corresponding plurality of resources and resources plans. As the one or more machine-learning models 304 are configured and/or trained, the weighting of the plurality of parameters of the one or more machine-learning models 304 can be modified until the error associated with the output of the one or more machine-learning models 304 is minimized to a predetermined level (e.g., a level associated with generating output that is at least 95% accurate). Configuring and/or training the one or more machine-learning models 304 can be performed over a plurality of rounds and/or iterations. Further, configuring and/or training the one or more machine-learning models 304 can end when a predetermined level of accuracy of the one or more machine-learning models 304 is achieved. Additionally, the one or more machine-learning models 304 can be periodically retrained based on updated training data. For example, with the passage of time additional training data based on new historical data associated with resources and/or resources plans can be added to the training data. Further, synthetic training data based on historical training data can be generated using one or more synthetic data generation techniques in which the synthetic training data can have statistical properties that are similar to the statistical properties of actual historical data.

Figure 4:
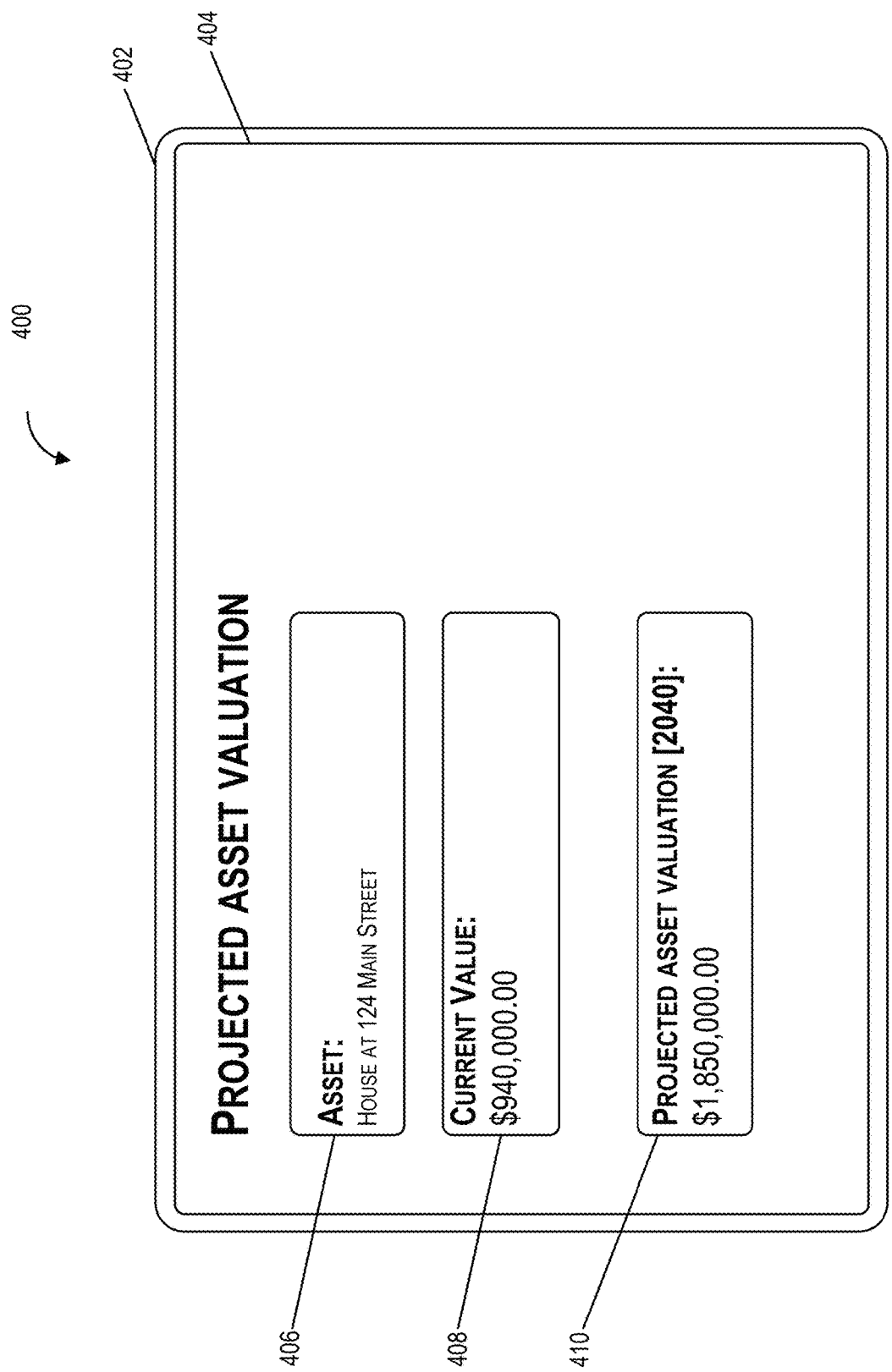
FIG. 4 depicts an example of an interface for generating projected asset valuations according to example embodiments of the present disclosure.

FIG. 4 depicts an example of an interface for generating projected asset valuations according to example embodiments of the present disclosure. A computing device 400 can include one or more attributes and/or capabilities of the computing system 110, the remote computing system 130, the one or more computing devices 152, and/or the computing device 200. Furthermore, the computing device 400 can be configured to perform one or more operations and/or one or more actions that can be performed by the computing system 110, the remote computing system 130, the one or more computing devices 152, and/or the computing device 200.

As shown in FIG. 4, the computing device 400 includes a display component 402, an interface 404, an interface element 406, an interface element 408, and an interface element 410.

The computing device 400 can include the display component 402 which can be configured to generate output comprising the interface (e.g., a graphical user interface) and content related to resource data (e.g., projected asset valuations) that can be displayed on the interface 404. The output generated by the computing device 400 can comprise one or more projected asset valuations of one or more assets (e.g., one or more assets associated with resources that are indicated in resource data). For example, the computing device 400 can access resource data that indicates the assets associated with resources and/or resource allocation instructions, and the estimated value of the assets (e.g., the fair market value and/or appraised value of the assets).

The computing device 400 can access the resource data associated with the assets and values of the assets based on one or more inputs to the interface 404. Further, the interface 404 can comprise interface elements that are configured to receive one or more inputs to cause the computing device 400 to perform operations associated with the interface element. For example, the computing device can implement a resource management application that maintains a database associated with one or more assets associated with resource data and/or resource allocation instructions, and/or the one or more entities (e.g., resource recipients) that are associated with the one or more assets. Based on the computing device 400 receiving one or more inputs to determine the projected value of a selected asset (e.g., real property comprising land and a house at a particular address) at a selected time in the future (e.g., "2040"), the computing device 400 can determine a projected value of the particular asset at the particular time. In this example, the selected asset is indicated in the interface element 406 "ASSET: HOUSE AT 124 MAIN STREET") which identifies the asset. Further, the computing device 400 can access data (e.g., resource data) and determine the current value of the asset ("$940,000.00") which is indicated in the interface element 408 ("CURRENT VALUE: $940,000.00"). In some embodiments, the computing device 400 can access data from a remote source (e.g., a remote database that stores estimated current values of various types of assets including real property).

Based on the current value of the selected asset and the selected time in the future (the year "2040"), the projected value of the selected asset can be determined and indicated in the interface element 410 ("PROJECTED ASSET VALUATION [2040]: $1,850,000.00"). For example, the computing device 400 can input data (e.g., input data) into one or more machine-learning models that are configured and/or trained to generate output comprising one or more projected asset valuations. In some embodiments, the computing device 400 can generate the one or more projected asset valuations based on the performance of one or more operations associated with rules-based processing of the resource data. For example, the computing device 400 can determine the one or more projected asset valuations based on the current values of the one or more assets and one or more predicted appreciation or depreciation rates based on historical asset values.

In this example, the projected asset valuation of the selected asset (e.g., the "HOUSE AT 124 MAIN STREET") is $1,850,000.00. In some embodiments, the projected asset valuation can comprise a range of values. For example, the projected asset valuation range for the selected asset could be in the range of $1,500,000.00 to $2,000,000.00. Further, the projected asset valuation can be associated with additional information such as a margin of error and/or confidence value.

Figure 5:
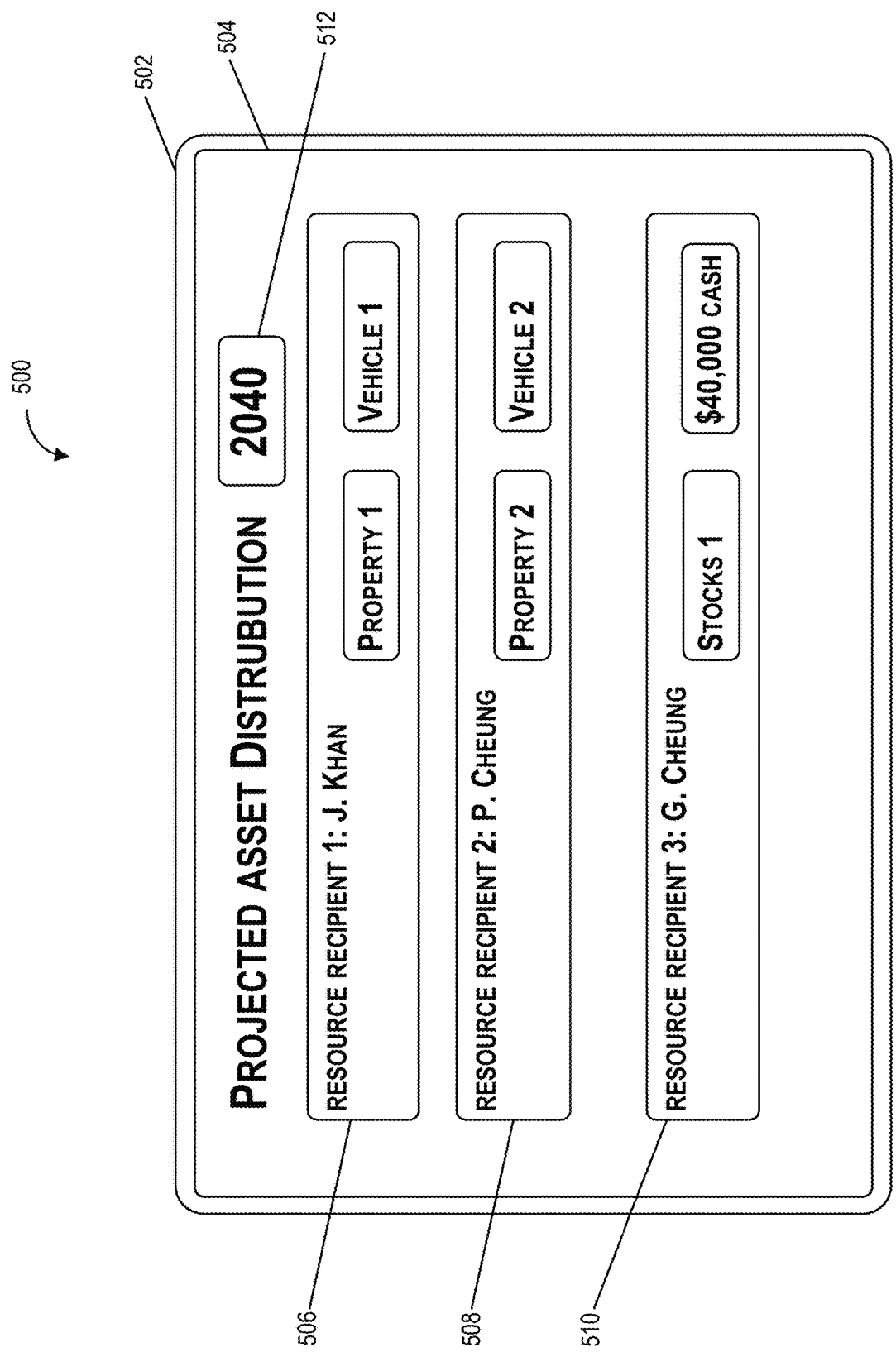
FIG. 5 depicts an example of an interface for generating projected asset distributions according to example embodiments of the present disclosure.

FIG. 5 depicts an example of an interface for generating projected asset distributions according to example embodiments of the present disclosure. A computing device 500 can include one or more attributes and/or capabilities of the computing system 110, the remote computing system 130, the one or more computing devices 152, and/or the computing device 200. Furthermore, the computing device 500 can be configured to perform one or more operations and/or one or more actions that can be performed by the computing system 110, the remote computing system 130, the one or more computing devices 152, and/or the computing device 200.

As shown in FIG. 5, the computing device 500 includes a display component 502, an interface 504, an interface element 506, an interface element 508, an interface element 510, and an interface element 512.

The computing device 500 can include the display component 502 which can be configured to generate output comprising the interface (e.g., a graphical user interface) and content related to resource data (e.g., projected asset distributions) that can be displayed on the interface 504. The output generated by the computing device 500 can comprise one or more projected asset distributions of a plurality of assets of a plurality of resource recipients (e.g., six assets that are distributed to three resource recipients). For example, the computing device 500 can access resource data that indicates the assets associated with resource allocation instructions, the resource recipients of the resources, and/or the resource allocation instructions which include can one or more rules (e.g., rules associated with provisions of a will or trust) for the distribution of the assets to the resource recipients.

The computing device 500 can access resource data associated with the assets, resource recipients, and/or projected asset distributions based on one or more inputs to the interface 504. Further, the interface 504 can comprise interface elements that are configured to receive one or more inputs to cause the computing device 500 to perform operations associated with the corresponding interface element. For example, the computing device can implement a resource management application that maintains a database associated with one or more assets associated with resources and the one or more entities (e.g., resource recipients) that are associated with the one or more assets. Based on the computing device 500 receiving one or more inputs to determine the projected asset distribution associated with a selected asset and/or one or more selected resource recipients at a selected time in the future (e.g., "2040") and based on various resource data including one or more relationships between the one or more resource recipients, the computing device 500 can determine a projected asset distribution at the particular time. In this example, the projected time is indicated in the interface element 512 ("2040") which indicates the year associated with the projected distribution. Further, the computing device 500 can access data (e.g., resource data) and determine the resource recipients associated with assets associated with resources. In some embodiments, the computing device 500 can access resource data from a remote source (e.g., a remote database that stores the names of the resource recipients and the assets that the resource recipients can receive).

Based on the resource recipients associated with the assets and the selected time in the future ("2040"), the projected asset distribution can be determined and indicated in the interface elements 506-510. For example, the computing device 500 can input data (e.g., input data) into one or more machine-learning models that are configured and/or trained to generate output comprising one or more projected asset distributions. In some embodiments, the computing device 500 can generate the one or more projected asset distributions based on the performance of one or more operations associated with rules-based processing of the resource data.

In this example, the projected asset distribution of the assets are indicated in the interface elements 506-510 that are generated in the interface 504. The interface element 506 indicates that a first resource recipient ("J. KHAN") is projected to receive property ("PROPERTY 1") and a vehicle ("VEHICLE 1"). The interface element 508 indicates that a second resource recipient ("P. CHEUNG") is projected to receive property ("PROPERTY 2") and a vehicle ("VEHICLE 2"). Further, the interface element 510 indicates that a third resource recipient ("G. CHEUNG") is projected to receive securities ("STOCK 1") and cash ("$40,000 CASH"). In some embodiments, specific details associated with the projected assets and/or resource recipients can be indicated. For example, the interface element 506 can indicate an address of the property, an estimated value of the property, the type of vehicle (e.g., a car, boat, or airplane), the make or model of the vehicle, or the estimated value of the vehicle. Further, the interface element 510 can indicate the value of the stocks, and/or identify the specific stocks.

Figure 6:
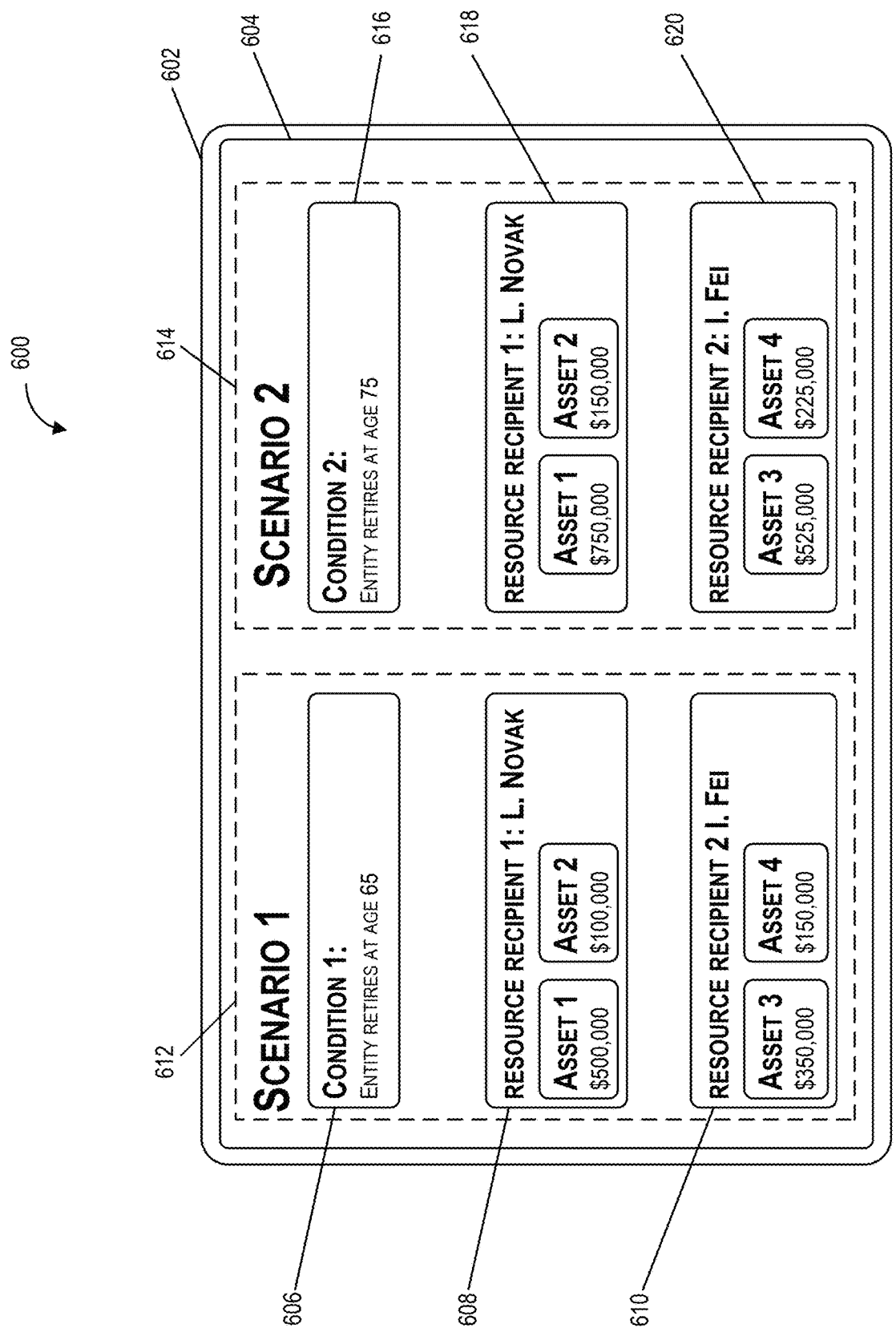
FIG. 6 depicts an example of an interface for generating resources scenarios according to example embodiments of the present disclosure.

FIG. 6 depicts an example of an interface for generating resources scenarios according to example embodiments of the present disclosure. A computing device 600 can include one or more attributes and/or capabilities of the computing system 110, the remote computing system 130, the one or more computing devices 152, and/or the computing device 200. Furthermore, the computing device 600 can be configured to perform one or more operations and/or one or more actions that can be performed by the computing system 110, the remote computing system 130, the one or more computing devices 152, and/or the computing device 200.

As shown in FIG. 6, the computing device 600 includes a display component 602, an interface 604, an interface element 606, an interface element 608, an interface element 610, a region 612, a region 614, an interface element 616, an interface element 618, and an interface element 620.

The computing device 600 can include the display component 602 which can be configured to generate output comprising the interface (e.g., a graphical user interface) and content related to resource data (e.g., resources scenarios) that can be displayed on the interface 604. The output generated by the computing device 600 can comprise a plurality of scenarios that can be based on one or more conditions associated with resource data. For example, the computing device 600 can access resource data that indicates one or more entities associated with resources and/or one or more assets of the resources. The resource data can comprise various information associated with the one or more entities including a time of hire of an entity; a projected retirement date of an entity; a date of birth of an entity (e.g., a testator associated with an estate a network administrator associated with a network of computing devices); and/or a planned retirement age and/or date.

The computing device 600 can access the resource data based on one or more inputs to the interface 604. Further, the interface 604 can comprise interface elements that are configured to receive one or more inputs to cause the computing device 600 to perform operations associated with the corresponding interface element. For example, the computing device can implement a resource management application that maintains a database associated with one or more assets of resources and the one or more entities (e.g., a testator and one or more resource recipients) that are associated with the one or more assets. Based on the computing device 600 receiving one or more inputs to determine the plurality of scenarios based on one or more conditions, the computing device 600 can determine the plurality of scenarios based on the one or more conditions. In this example, the one or more conditions can comprise a planned retirement age of the entity (e.g., retirement age of a testator and/or a network administrator).

Based on the one or more conditions comprising the planned retirement age of the testator, the computing device 600 can generate a plurality of scenarios comprising "SCENARIO 1" which is indicated in the region 612 of the interface 604 and "SCENARIO 2" which is indicated in the region 614 of the interface 604. The computing device 600 can generate the scenarios based on inputting data (e.g., input data) into one or more machine-learning models that are configured and/or trained to generate output comprising one or more scenarios. The input data can comprise information associated with the one or more conditions (e.g., a retirement age of the testator and/or network administrator) and resource data comprising one or more assets of the resources, one or more resource recipients of the resources, rule data indicating one or more rules associated with the resources including projected taxes, projected resources fees, and/or a projected distribution of the assets to the one or more resource recipients. Further, the one or more machine-learning models can be configured and/or trained to determine projected values of the assets based on factors including projected inflation, appreciation of asset values, depreciation of asset values, future taxes, future fees, and/or potential expenses (e.g., medical expenses). The one or more machine-learning models can be configured and/or trained based on training data that can comprise a plurality of training resource data, a plurality of training conditions, a plurality of training rule data, a plurality of scenarios and a corresponding plurality of ground-truth scenarios.

In some embodiments, the computing device 600 can generate the one or more projected asset valuations based on the performance of one or more operations associated with rules-based processing of the resource data. For example, the computing device 600 can access information associated with an estimated appreciation and/or depreciation rate of the one or more assets of the resources based on the one or more conditions (e.g., the planned retirement age of the testator and/or network administrator). Using the rules-based approach to processing the resource data, the computing device 600 can determine that the total value of the assets can be associated with the retirement age of the entity (e.g., a testator or network administrator) such that the value of the assets is based on the age at which the entity retires. For example, if a testator retires at an older age the value of assets (e.g., assets of an estate) can appreciate and be greater than if the testator retires at a younger age. By way of further example, the value of assets (e.g., computing devices of a network) can depreciate and be lower if a network administrator retires at an older age than if the network administrator retires at a younger age. Further, the computing device 600 can use one or more statistical techniques (e.g., linear regression) to generate the one or more scenarios.

In this example, scenario 1, indicated in the region 612 is based on a first condition ("CONDITION 1: ENTITY RETIRES AT AGE 65") indicated in the interface element 606 in which an entity (e.g., a testator of an estate) retires at the age of 65. Further, in the first scenario under the first condition, the interface element 608 indicates that the first resource recipient "L. NOVAK" may receive "ASSET 1" (e.g., a real property) valued at $500,000 and "ASSET 2" (e.g., stocks) valued at $100,000. Additionally, in the first scenario under the first condition, the interface element 610 indicates that the second resource recipient "I. FEI" may receive "ASSET 3" (e.g., a real property) valued at $350,000 and "ASSET 4" (e.g., bonds) valued at $150,000.

In scenario 2, indicated in the region 614 is based on a second condition ("CONDITION 2: ENTITY RETIRES AT AGE 75") indicated in the interface element 616 in which the entity (e.g., a testator) retires at the age of 75. Further, in the second scenario under the second condition, the interface element 618 indicates that the first resource recipient "L. NOVAK" may receive "ASSET 1" (e.g., a real property) valued at $750,000 and "ASSET 2" (e.g., stocks) valued at $150,000. Further, in the second scenario under the second condition, the interface element 620 indicates that the second resource recipient "I. FEI" may receive "ASSET 3" (e.g., a real property) valued at $525,000 and "ASSET 4" (e.g., bonds) valued at $225,000.

Figure 7A:
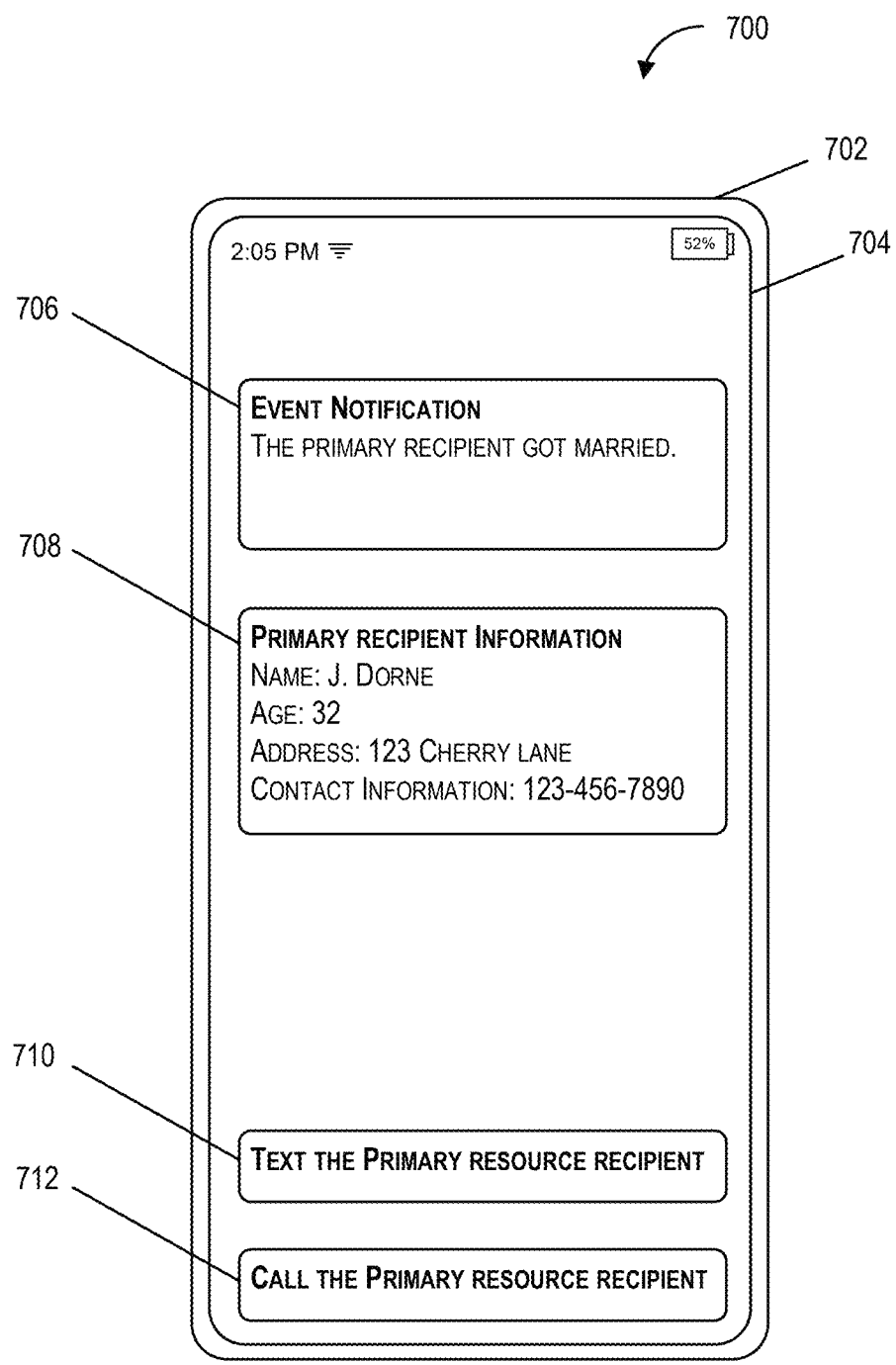
FIG. 7A depicts an example of an interface for generating event notifications according to example embodiments of the present disclosure.

FIG. 7A depicts an example of an interface for generating event notifications according to example embodiments of the present disclosure. A computing device 700 can include one or more attributes and/or capabilities of the computing system 110, the remote computing system 130, the one or more computing devices 152, and/or the computing device 200. Furthermore, the computing device 700 can be configured to perform one or more operations and/or one or more actions that can be performed by the computing system 110, the remote computing system 130, the one or more computing devices 152, and/or the computing device 200.

As shown in FIG. 7A, the computing device 700 includes a display component 702, an interface 704, an interface element 706, an interface element 708, an interface element 710, and an interface element 712.

The computing device 700 can include the display component 702 which can be configured to generate output comprising the interface (e.g., event notifications) and content related to resource data (e.g., projected asset valuations) that is displayed on the interface 704. The output generated by the computing device 700 can comprise one or more event notifications associated with one or more events. For example, the computing device 700 can access event data associated with one or more events and/or resource data associated with resources.

The computing device 700 can implement a resource management application that is configured to receive event data via a network (e.g., a wireless network such as the network 102) and generate an event notification that can be indicated in the interface 704. In this example, the interface element 706 comprises an event notification that indicates that a particular event ("THE PRIMARY RESOURCE RECIPIENT GOT MARRIED") has occurred. In some embodiments, the resource management application can operate as a process in the background of the operating system of the computing device 700 and generate one or more notifications when the resource management application is not actively being used by a user. In some embodiments, the computing device 700 can be configured to generate one or more auditory notifications (e.g., a chime or short portion of music) when event data associated with an event is received. Further, a computing device that generates the event data can be configured to send the event data to other computing devices that are associated with an entity that is authorized to receive the one or more event notifications. For example, the event data can be sent to the computing device (e.g., smart phone) of a lawyer that is the executor of an estate.

Further, based on receiving the event data, the computing device 700 can access resource data associated with the entity that is associated with the event notification and generate the interface element 708, which indicates that the primary resource recipient is named "J. DORNE" who is "32" years of age, has an address of "123 CHERRY LANE" and has contact information (a phone number) of "123-456-7890." Further, the computing device 700 can generate the interface element 710 which indicates "TEXT THE PRIMARY RESOURCE RECIPIENT" and can be configured to send a text message to the primary resource recipient (e.g., "J. DORNE") based on the entity information indicated in the interface element 708. The computing device 700 can also generate the interface element 712 which indicates "CALL THE PRIMARY RESOURCE RECIPIENT" and can be configured to make a telephone call to the primary resource recipient (e.g., "J. DORNE") based on the entity information indicated in the interface element 708.

Figure 7B:
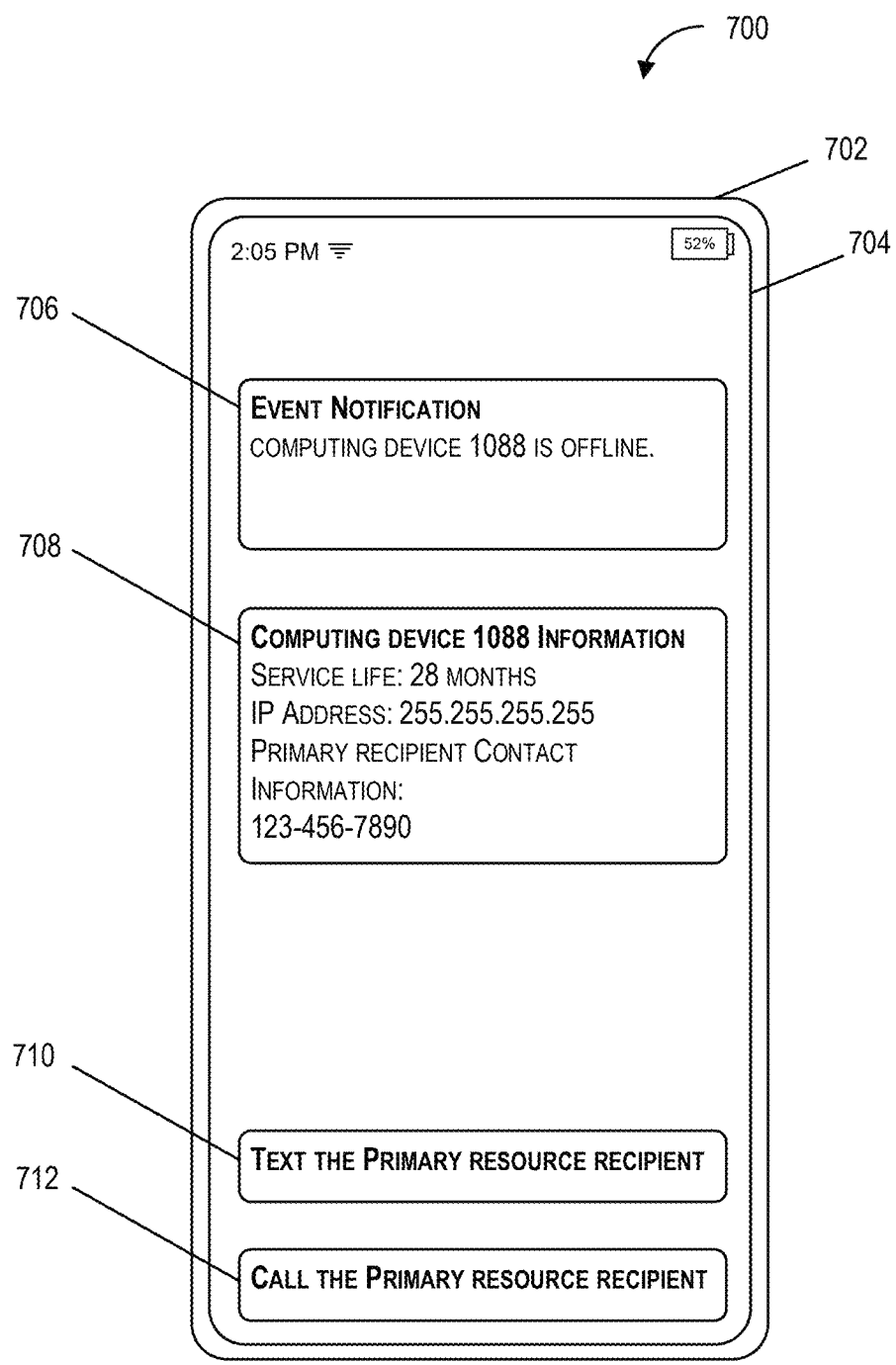
FIG. 7B depicts an example of an interface for generating event notifications according to example embodiments of the present disclosure.

FIG. 7B depicts an example of an interface for generating event notifications according to example embodiments of the present disclosure. A computing device 700 can include one or more attributes and/or capabilities of the computing system 110, the remote computing system 130, the one or more computing devices 152, and/or the computing device 200. Furthermore, the computing device 700 can be configured to perform one or more operations and/or one or more actions that can be performed by the computing system 110, the remote computing system 130, the one or more computing devices 152, and/or the computing device 200.

As shown in FIG. 7B, the computing device 700 includes a display component 702, an interface 704, an interface element 706, an interface element 708, an interface element 710, and an interface element 712.

The computing device 700 can include the display component 702 which can be configured to generate output comprising the interface (e.g., event notifications) and content related to resource data (e.g., projected asset valuations) that is displayed on the interface 704. The output generated by the computing device 700 can comprise one or more event notifications associated with one or more events. For example, the computing device 700 can access event data associated with one or more events and/or resource data associated with resources.

The computing device 700 can implement a resource management application that is configured to receive event data via a network (e.g., a wireless network such as the network 102) and generate an event notification that can be indicated in the interface 704. In this example, the interface element 706 comprises an event notification that indicates that a particular event ("COMPUTING DEVICE 1088 IS OFFLINE") has occurred (e.g., a server computing device in a server computing center is offline). In some embodiments, the resource management application can operate as a process in the background of the operating system of the computing device 700 and generate one or more notifications when the resource management application is not actively being used by a user. In some embodiments, the computing device 700 can be configured to generate one or more auditory notifications (e.g., a chime or short portion of music) when event data associated with an event is received. Further, a computing device that generates the event data can be configured to send the event data to other computing devices that are associated with an entity that is authorized to receive the one or more event notifications. For example, the event data can be sent to the computing device (e.g., smart phone) of a network administrator, who is the administrator of a computer network.

Further, based on receiving the event data, the computing device 700 can access resource data associated with the entity that is associated with the event notification and generate the interface element 708, which indicates that the primary resource recipient is named "COMPUTING DEVICE 1088 INFORMATION" that the service life of the server computing device is "28 MONTHS," that the IP address associated with the server computing device is "255.255.255.255," and that the primary recipients contact information (e.g., the network administrator's telephone number) is "123-456-7890." Further, the computing device 700 can generate the interface element 710 which indicates "TEXT THE PRIMARY RESOURCE RECIPIENT" and can be configured to send a text message to the primary resource recipient (e.g., a network administrator) based on the entity information indicated in the interface element 708. The computing device 700 can also generate the interface element 712 which indicates "CALL THE PRIMARY RESOURCE RECIPIENT" and can be configured to make a telephone call to the primary resource recipient (e.g., a network administrator) based on the entity information indicated in the interface element 708.

Figure 8A:
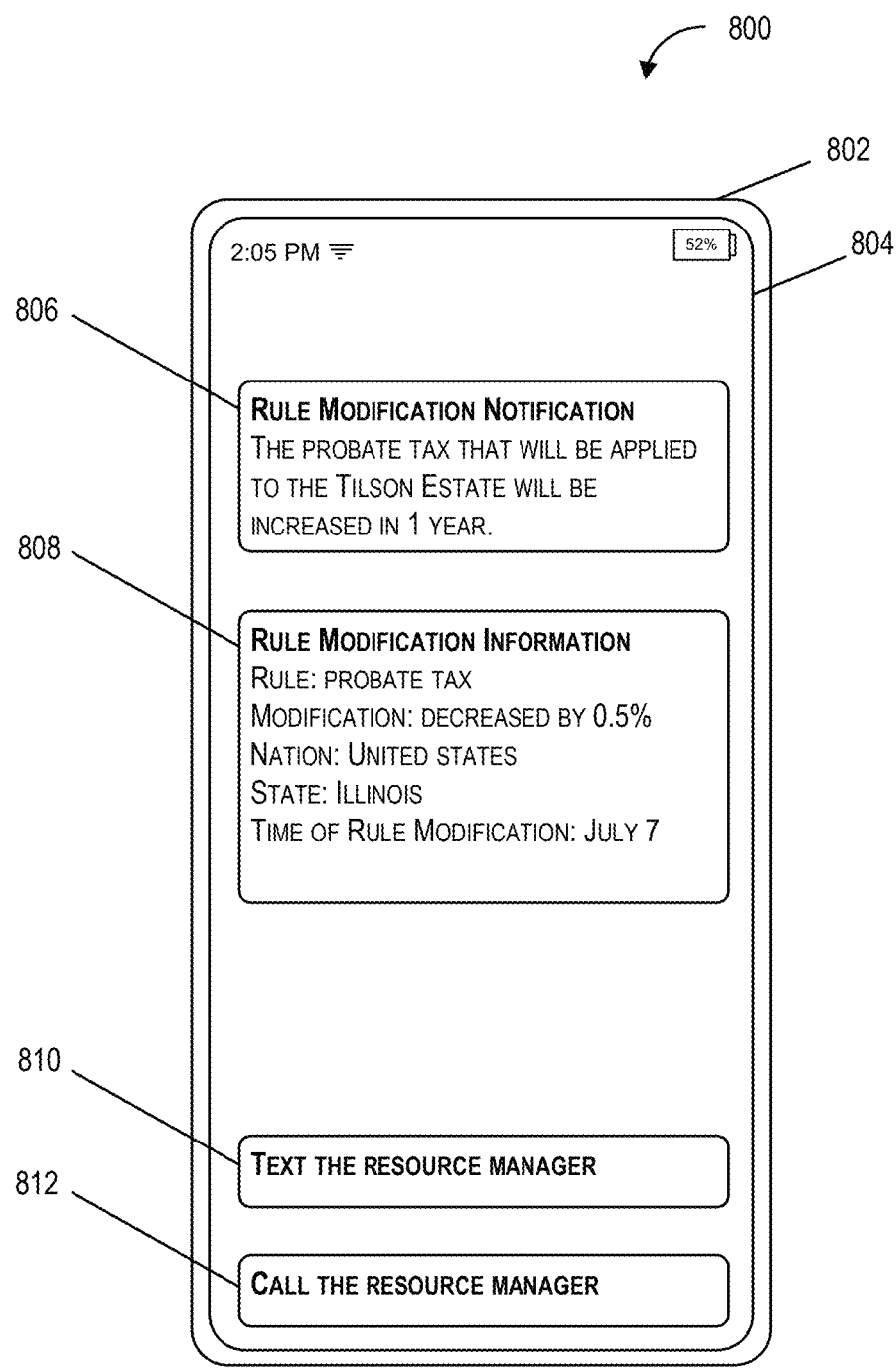
FIG. 8A depicts an example of an interface for generating rule modification notifications according to example embodiments of the present disclosure.

FIG. 8A depicts an example of an interface for generating rule modification notifications according to example embodiments of the present disclosure. A computing device 800 can include one or more attributes and/or capabilities of the computing system 110, the remote computing system 130, the one or more computing devices 152, and/or the computing device 200. Furthermore, the computing device 800 can be configured to perform one or more operations and/or one or more actions that can be performed by the computing system 110, the remote computing system 130, the one or more computing devices 152, and/or the computing device 200.

As shown in FIG. 8A, the computing device 800 includes a display component 802, an interface 804, an interface element 806, an interface element 808, an interface element 810, and an interface element 812.

The computing device 800 can include the display component 802 which can be configured to generate output comprising the interface (e.g., a graphical user interface) and content related to resource data (e.g., rule modification notifications) that can be displayed on the interface 804. The output generated by the computing device 800 can comprise one or more rule modification notifications associated with one or more modifications of one or more regulations. For example, the computing device 800 can receive data associated with one or more rule modifications (e.g., changes in one or more laws) that are associated with resources and/or that could have an effect on one or more assets and/or one or more entities associated with the resources. Based on receiving the data associated with one or more modifications of one or more regulations, the computing device 800 can access resource data and determine that the increase in the probate tax may affect the future value of one or more assets of resources. Based on the data associated with one or more modifications of one or more regulations and/or the resource data, the computing device 800 can generate one or more rule modification notifications that can indicate one or more regulations that have been or may be likely to be modified.

In this example, the computing device 800 can implement a resource management application that is configured to receive data associated with one or more modifications of one or more regulations via a network (e.g., a wireless network such as the network 102) and generate the rule modification notification that can be indicated in the interface 804. Further, the interface element 806 comprises a rule modification notification that indicates that a particular regulation will soon be modified. In particular, the interface element 806 indicates "THE PROBATE TAX THAT WILL BE APPLIED TO THE TILSON RESOURCES WILL BE INCREASED IN 1 YEAR." In some embodiments, the resource management application can operate as a process in the background of the operating system of the computing device 800 and generate one or more rule modification notifications when the resource management application is not actively being used by a user. In some embodiments, the computing device 800 can be configured to generate one or more auditory notifications (e.g., a beep or brief announcement) when one or more rule modification notifications associated with a rule modification are received. Further, a computing device that generates the one or more rule modification notifications can be configured to send the one or more rule modification notifications to other computing devices that are associated with an entity that is authorized to receive the one or more rule modification notifications. For example, one or more rule modification notifications can be sent to the computing device (e.g., smart phone) of a resource manager that is associated with resources.

Further, based on receiving the data associated with one or more modifications of one or more regulations, the computing device 800 can access resource data associated with the resources that is associated with the rule modification notification and generate the interface element 808, which indicates "RULE MODIFICATION INFORMATION" including that the rule is associated with "PROBATE TAX" that the modification of the rule is that the probate tax will be "DECREASED BY 0.5%" and that the rule applies to assets in "ILLINOIS" in the "UNITED STATES." The computing device 800 can generate rule modification information indicating "THE TIME OF RULE MODICIATION: July 7" which indicates a time at which the change in the probate tax rate may occur.

Further, the computing device 800 can generate the interface element 810 which indicates "TEXT THE RESOURCE MANAGER" and can be configured to send a text message to a resource manager (e.g., an estate manager) of the resources (e.g., resources comprising assets of an estate) associated with the rule modification notification. The computing device 800 can also generate the interface element 812 which indicates "CALL THE RESOURCE MANAGER" and can be configured to make a telephone call to the resource manager of the resources associated with the rule modification notification.

Figure 8B:
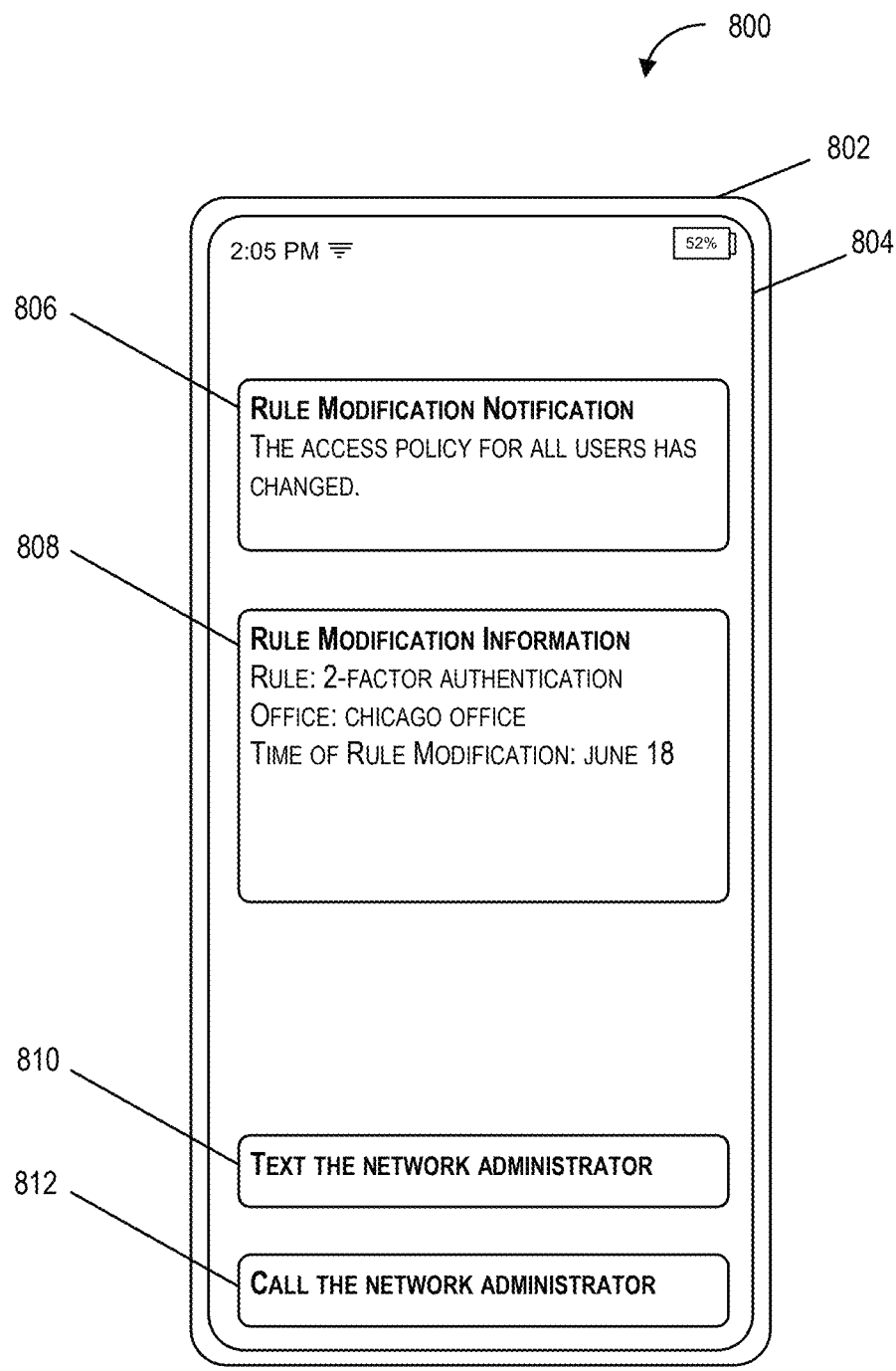
FIG. 8B depicts an example of an interface for generating event notifications according to example embodiments of the present disclosure.

FIG. 8B depicts an example of an interface for generating rule modification notifications according to example embodiments of the present disclosure. A computing device 800 can include one or more attributes and/or capabilities of the computing system 110, the remote computing system 130, the one or more computing devices 152, and/or the computing device 200. Furthermore, the computing device 800 can be configured to perform one or more operations and/or one or more actions that can be performed by the computing system 110, the remote computing system 130, the one or more computing devices 152, and/or the computing device 200.

As shown in FIG. 8B, the computing device 800 includes a display component 802, an interface 804, an interface element 806, an interface element 808, an interface element 810, and an interface element 812.

The computing device 800 can include the display component 802 which can be configured to generate output comprising the interface (e.g., a graphical user interface) and content related to resource data (e.g., rule modification notifications) that can be displayed on the interface 804. The output generated by the computing device 800 can comprise one or more rule modification notifications associated with one or more modifications of one or more regulations. For example, the computing device 800 can receive data associated with one or more rule modifications (e.g., changes in one or more access policies for computing devices) that are associated with resources and/or that could have an effect on one or more assets and/or one or more entities associated with the resources. Based on receiving the data associated with one or more modifications of one or more regulations, the computing device 800 can access resource data and determine that the change in the access policy may affect the future value of one or more assets of resources. For example, a 2-factor authentication policy may result in more technical support calls and/or reduce usage of affected computing devices. The net value of computing devices can be based on the value derived from users using the computing device to perform revenue generating activities minus the costs to purchase and maintain the computing devices. Increasing the costs to maintain the computing devices (e.g., more technical support calls) and reducing user usage of the computing devices can reduce the net value of the computing assets. Based on the data associated with one or more modifications of one or more regulations and/or the resource data, the computing device 800 can generate one or more rule modification notifications that can indicate one or more regulations that have been or may be likely to be modified.

In this example, the computing device 800 can implement a resource management application that is configured to receive data associated with one or more modifications of one or more regulations via a network (e.g., a wireless network such as the network 102) and generate the rule modification notification that can be indicated in the interface 804. Further, the interface element 806 comprises a rule modification notification that indicates that a particular regulation (e.g., access policy) will soon be modified. In particular, the interface element 806 indicates "THE ACCESS POLICY FOR ALL USERS HAS CHANGED." In some embodiments, the resource management application can operate as a process in the background of the operating system of the computing device 800 and generate one or more rule modification notifications when the resource management application is not actively being used by a user. In some embodiments, the computing device 800 can be configured to generate one or more auditory notifications (e.g., a beep or brief announcement) when one or more rule modification notifications associated with a rule modification are received. Further, a computing device that generates the one or more rule modification notifications can be configured to send the one or more rule modification notifications to other computing devices that are associated with an entity that is authorized to receive the one or more rule modification notifications. For example, one or more rule modification notifications can be sent to the computing device (e.g., smart phone) of a resource manager that is associated with resources.

Further, based on receiving the data associated with one or more modifications of one or more regulations, the computing device 800 can access resource data associated with the resources that is associated with the rule modification notification and generate the interface element 808, which indicates "RULE MODIFICATION INFORMATION" including that the rule is associated with "2-FACTOR AUTHENTICATION" that the rule applies to assets (e.g., computing devices) in the "CHICAGO OFFICE." The computing device 800 can generate rule modification information indicating "THE TIME OF RULE MODICIATION: June 18" which indicates a time at which the change in the access policy may occur.

Further, the computing device 800 can generate the interface element 810 which indicates "TEXT THE NETWORK ADMINISTRATOR" and can be configured to send a text message to a resource manager (e.g., network administrator) of the resources associated with the rule modification notification. The computing device 800 can also generate the interface element 812 which indicates "CALL THE NETWORK ADMINISTRATOR" and can be configured to make a telephone call to the resource manager (e.g., network administrator) of the resources associated with the rule modification notification.

Figure 9:
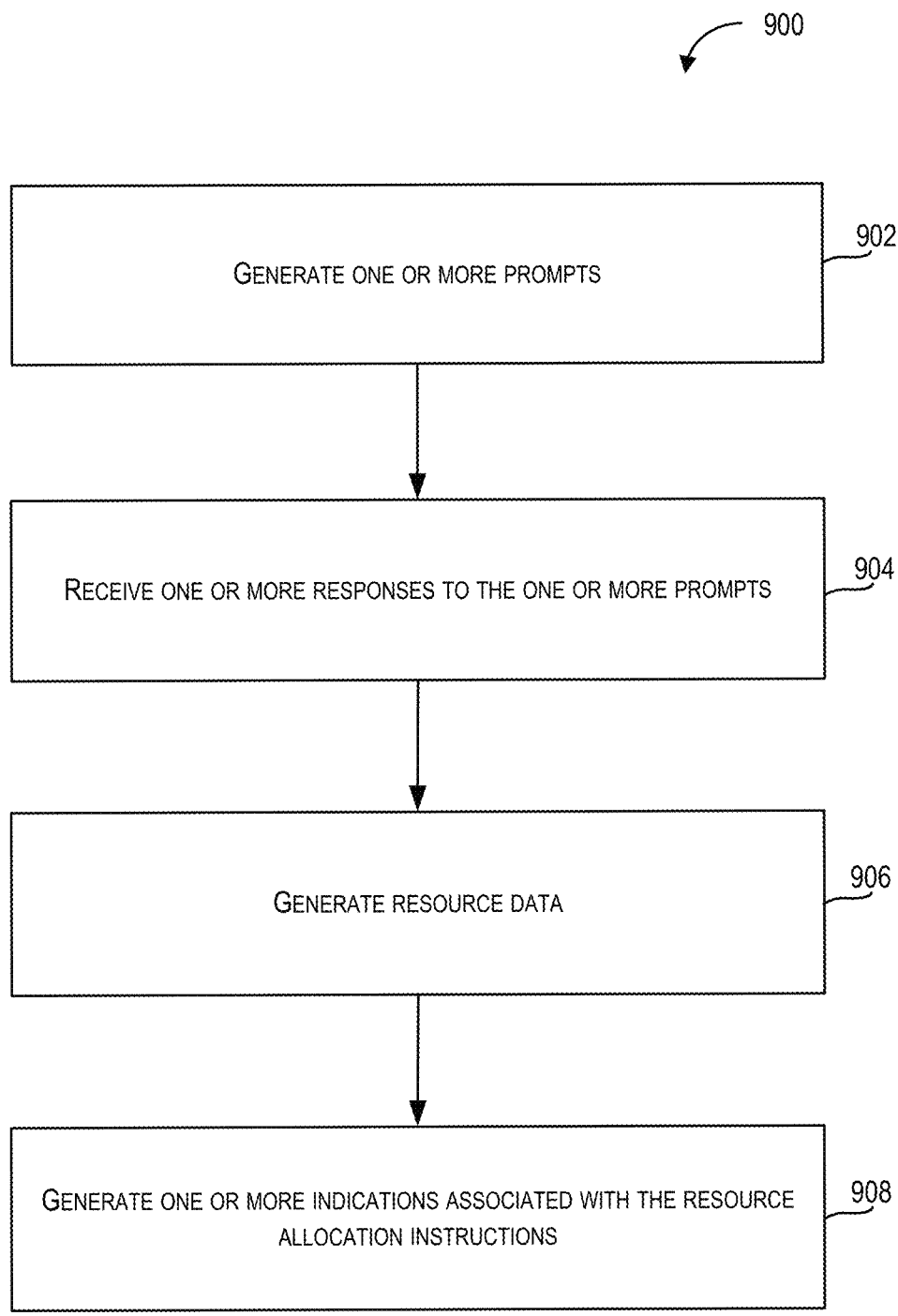
FIG. 9 depicts a flow diagram of an example method for generating resource data according to example embodiments of the present disclosure.
Figure 10:
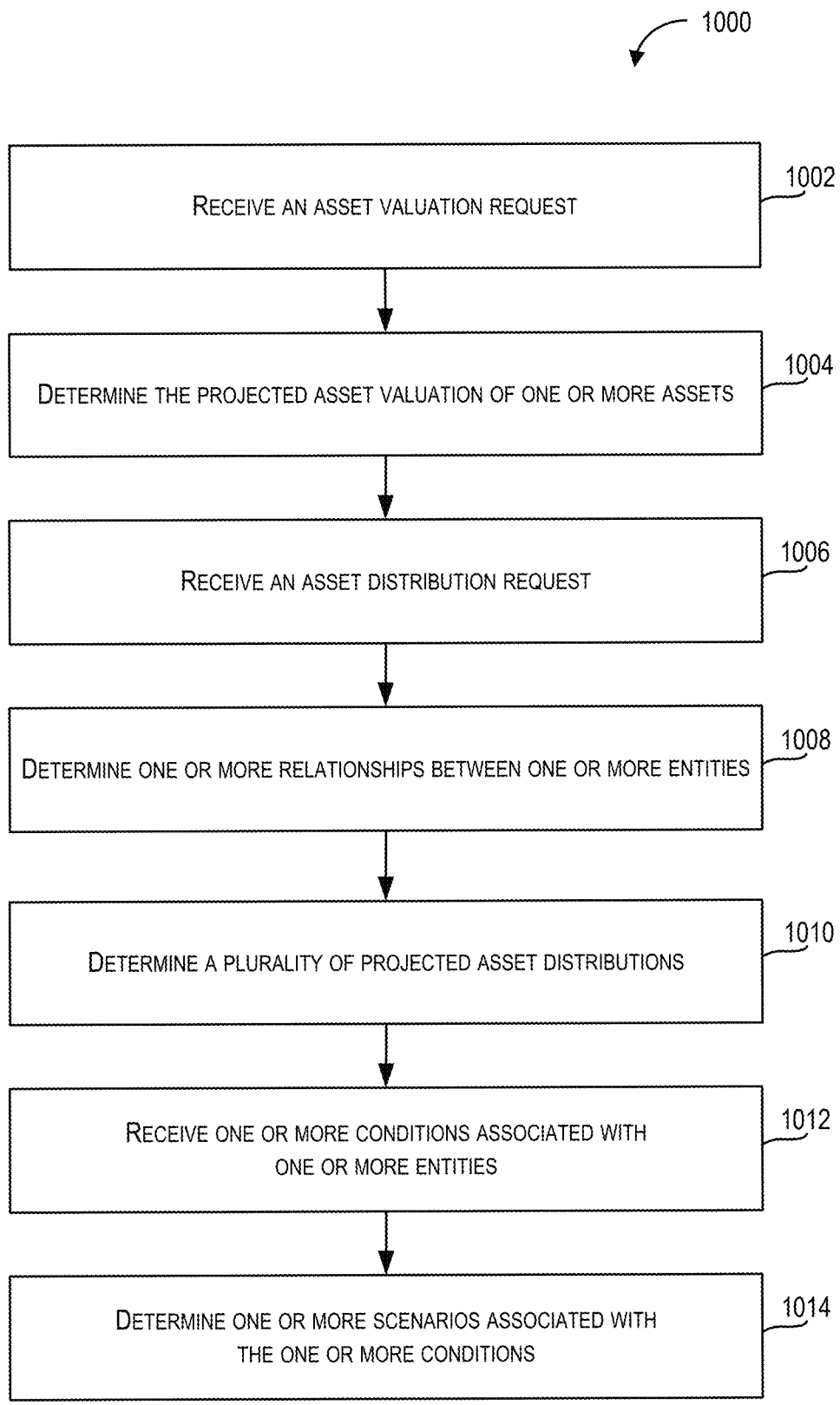
FIG. 10 depicts a flow diagram of an example method for generating resource data according to example embodiments of the present disclosure.

FIG. 9 depicts a flow diagram of generating resource data according to example embodiments of the present disclosure. One or more portions of the method 1000 can be executed and/or implemented on one or more computing devices or computing systems including, for example, the computing system 110, the remote computing system 130, the one or more computing devices 152, and/or the computing device 200. Further, one or more portions of the method 1000 can be executed or implemented as an algorithm on the hardware devices or systems disclosed herein. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include generating one or more prompts comprising requests for information associated with resource allocation instructions for distribution of resources. The one or more prompts can be based on one or more resource documents associated with the resources. The one or more resource documents comprise one or more resource document fields. The resource allocation instructions can be associated with distribution of one or more assets of the resources to one or more entities that can comprise one or more resource recipients. For example, the computing system 110 can generate the one or more prompts based on parsing (e.g., using optical character recognition techniques and natural language processing techniques) the one or more resource documents associated with the resources. In some embodiments, the one or more prompts can be associated with the processing and/or allocation of computing resources. In some embodiments, the one or more prompts can be associated with the distribution of one or more assets of an estate to one or more entities associated with the estate (e.g., one or more beneficiaries).

At 904, the method 900 can include receiving one or more responses to the one or more prompts. For example, the computing system 110 can receive one or more responses via a user interface generated by the computing system 110. Further, the one or more responses can include a combination of textual and/or numerical information.

At 906, the method 900 can include generating resource data based on one or more responses and/or rule data that can comprise one or more rules associated with the resources. The resource data can comprise one or more resource data fields and one or more resource data field values that correspond to the one or more resource data fields. The one or more resource data fields are based on the one or more resource document fields. The one or more resource data field values are based on the one or more responses. For example, the computing system 110 can generate the resource data based on inputting the one or more responses to the one or more prompts and rule data associated with the resource data into one or more machine-learning models that are configured and/or trained to generate the resource data.

At 908, the method 900 can include generating based on the resource data, one or more indications associated with the resource allocation instructions. The one or more indications can comprise one or more visualizations of the distribution of the one or more assets to the one or more resource recipients. For example, the computing system 110 can generate one or more indications comprising a text-based indication of the assets to be distributed to various resource recipients based on the current resources allocation instructions.

FIG. 10 depicts a flow diagram of generating resource data according to example embodiments of the present disclosure. One or more portions of the method 1000 can be executed and/or implemented on one or more computing devices or computing systems including, for example, the computing system 110, the remote computing system 130, the one or more computing devices 152, and/or the computing device 200. Further, one or more portions of the method 1000 can be executed or implemented as an algorithm on the hardware devices or systems disclosed herein. In some embodiments, one or more portions of the method 1000 can be performed as part of the method 900 that is described with respect to FIG. 9. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include receiving an asset valuation request associated with a projected asset valuation of one or more assets. For example, the computing system 110 can receive data comprising an asset valuation request associated with the projected value of a house ten years from the current date.

At 1004, the method 1000 can include determining based on the resource data, the projected asset valuation of the one or more assets. The one or more indications associated with the resource allocation instructions comprise the projected asset valuation of the one or more assets. For example, the computing system 110 can implement a machine-learning model that is configured and/or trained to receive the resource data and the asset valuation request as input and generate output comprising the projected asset valuation of the one or more assets.

At 1006, the method 1000 can include receiving an asset distribution request associated with a projected asset distribution of the one or more assets to the one or more entities. For example, the computing system 110 can receive data comprising an asset distribution request associated with the projected asset distribution of resources to four resource recipients based on the current resources plan.

At 1008, the method 1000 can include determining based on the resource data, one or more relationships between the one or more entities. For example, the computing system 110 can determine the one or more relationships based on the resource data comprising the names of the resource recipients that can receive assets (e.g., be assigned to computing devices) based on their relation to other resource recipients (e.g., manager-client relationship, employer-employee relationship, and/or administrator-user relationship). By way of further example, the computing system 110 can determine the one or more relationships based on the resource data comprising the names of the resource recipients and the children of resource recipients that can receive assets based on their relation to their parents and/or direct conveyance of assets in the resource allocation instructions.

At 1010, the method 1000 can include determining based on the resource data and the one or more relationships between the one or more entities, a plurality of projected asset distributions of the one or more assets to the one or more entities. The one or more indications associated with the resource allocation instructions comprise the plurality of projected asset distributions of the one or more assets to the one or more entities. For example, the computing system 110 can implement a machine-learning model that is configured and/or trained to receive input comprising the resource data and data associated with the one or more relationships asset valuation request as input and generate output comprising the projected asset distributions of the one or more assets to the one or more entities.

At 1012, the method 1000 can include receiving one or more conditions associated with the one or more entities or the one or more assets. For example, the computing system 110 can receive data comprising one or more conditions comprising a planned retirement age of a network administrator, a planned end of service date for computing devices, a life expectancy of a testator, and/or the end date of a lease on a property owned by the testator.

At 1014, the method 1000 can include determining one or more scenarios associated with the one or more conditions. The one or more scenarios comprise one or more projected valuations of the one or more assets or one or more predicted distributions of the one or more assets to the one or more resource recipients. The one or more indications associated with the resource allocation instructions comprise the one or more scenarios associated with the one or more scenarios. For example, the computing system 110 can use one or more rules-based techniques to determine a scenario that indicates the future value of real property based on conditions including the current value of the property and the life expectancies of the testator that owns the property and the primary resource recipient of the property. By way of further example, the computing system 110 can use one or more rules-based techniques to determine a scenario that indicates the future value of computing devices based on conditions including the current value of the computing devices and the mean time before failure of the computing devices. In some implementations, the computing system 110 can determine one or more scenarios based on implementing a machine-learning model that is configured and/or trained to receive input comprising the resource data and data associated with the one or more conditions as input and generate output comprising the one or more scenarios.

Figure 11:
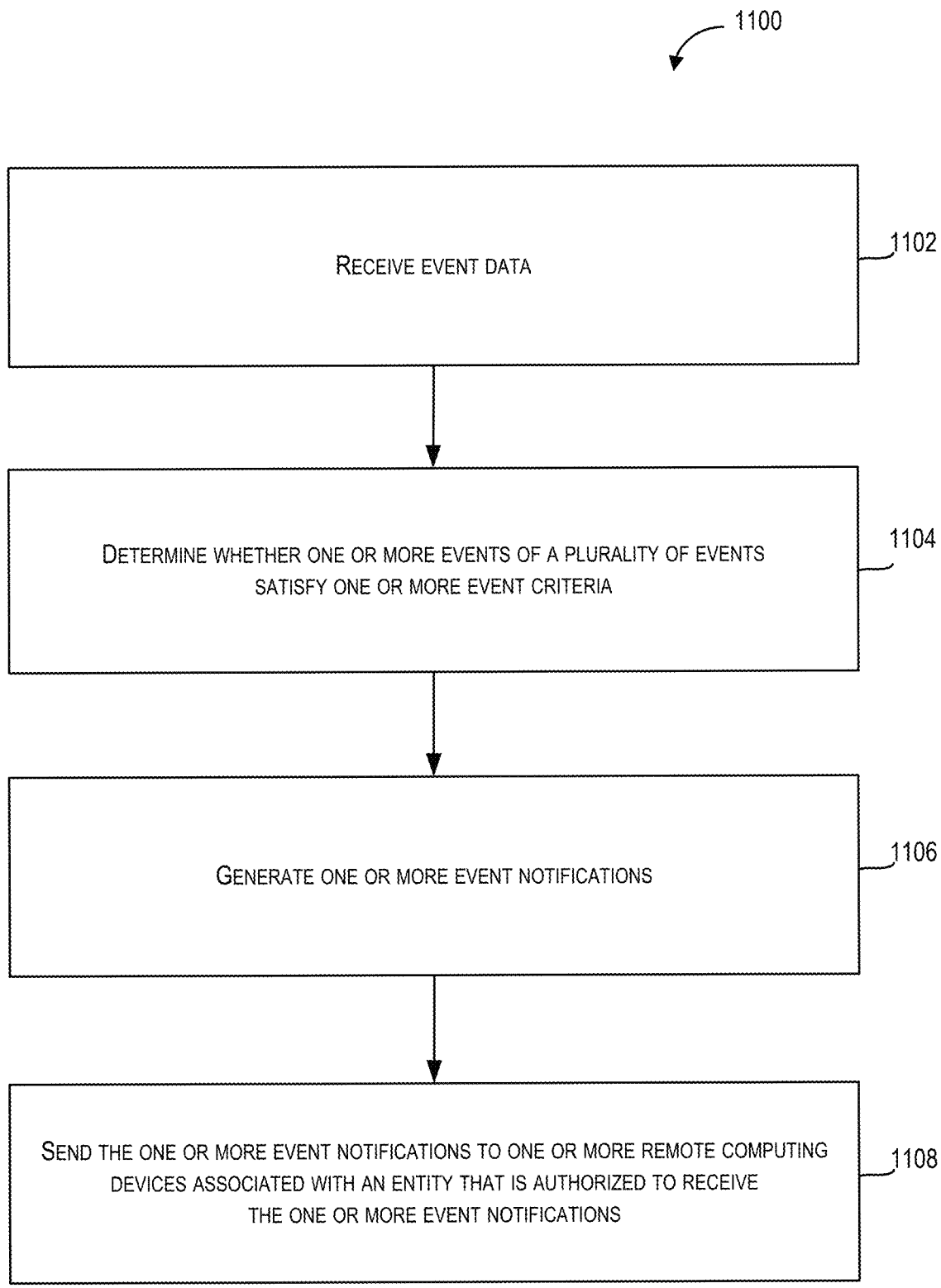
FIG. 11 depicts a flow diagram of an example method for generating resource data according to example embodiments of the present disclosure.

FIG. 11 depicts a flow diagram of generating resource data according to example embodiments of the present disclosure. One or more portions of the method 1000 can be executed and/or implemented on one or more computing devices or computing systems including, for example, the computing system 110, the remote computing system 130, the one or more computing devices 152, and/or the computing device 200. Further, one or more portions of the method 1000 can be executed or implemented as an algorithm on the hardware devices or systems disclosed herein. In some embodiments, one or more portions of the method 1100 can be performed as part of the method 900 that is described with respect to FIG. 9. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include receiving event data comprising information associated with a plurality of events associated with the resources. In some embodiments, the event data can be included as part of the resource data and/or added to the resource data. For example, the computing system 110 can receive event data comprising information associated with adding a computing device to a network, removing a computing device from a network, and/or the birth of a child of a resource recipient.

At 1104, the method 1100 can include determining based on resource data comprising information associated with a plurality of events associated with the resources, whether one or more events of the plurality of events satisfy one or more event criteria. For example, the computing system 110 can access data associated with one or more event criteria (e.g., event criteria data). The event criteria data can comprise one or more qualifying events that, contingent on the qualifying event occurring, may satisfy the one or more event criteria. For example, the one or more qualifying events can comprise adding a device to a network, removing a device from a network, changing the configuration of a device, changing the entity to whom a device is assigned (e.g., smartphone assignment for employees of an organization), the birth of a child of a resource recipient and/or a resource recipient reaching the age of majority.

At 1106, the method 1100 can include generating one or more event notifications associated with the one or more events that satisfy the one or more event criteria. The one or more indications associated with the resource allocation instructions comprise the one or more event notifications. For example, based on the event that satisfies the one or more event criteria comprising the birth of a child of a resource recipient, the computing system 110 can generate one or more event notifications indicating that a child of the resource recipient was born. By way of further example, based on the event that satisfies the one or more event criteria comprising the addition of a computing device of a resource recipient, the computing system 110 can generate one or more event notifications indicating that a computing device was assigned to a resource recipient.

At 1108, the method 1100 can include sending the one or more event notifications to one or more remote computing devices associated with an entity that is authorized to receive the one or more event notifications. For example, the computing system 110 can send the one or more event notifications to an entity that is authorized to receive the one or more event notifications such as a network administrator that operates the resources of a computing network. By way of further example, the computing system 110 can send the one or more event notifications to an entity that is authorized to receive the one or more event notifications such as a network administrator and/or a lawyer that is the executor of the resources of an estate. Further, the one or more event notifications can be sent via a network (e.g., the network 102).

Figure 12:
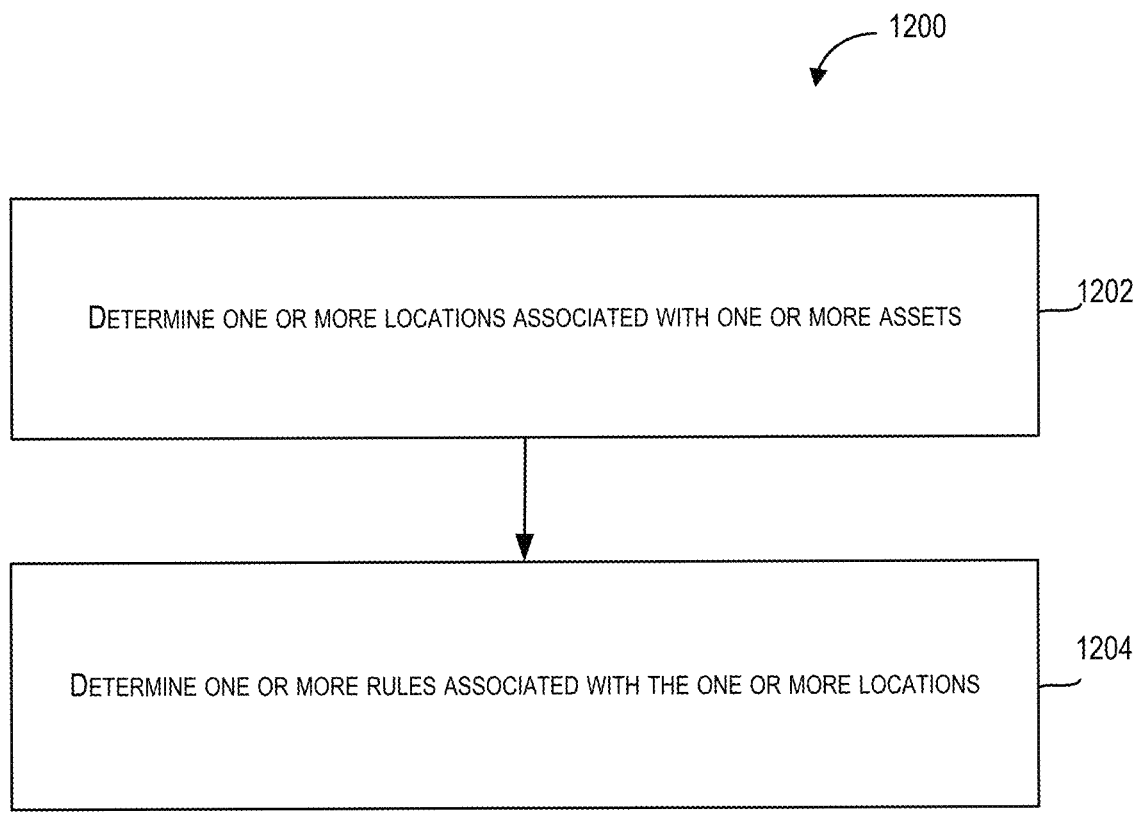
FIG. 12 depicts a flow diagram of an example method for generating resource data according to example embodiments of the present disclosure.

FIG. 12 depicts a flow diagram of generating resource data according to example embodiments of the present disclosure. One or more portions of the method 1000 can be executed and/or implemented on one or more computing devices or computing systems including, for example, the computing system 110, the remote computing system 130, the one or more computing devices 152, and/or the computing device 200. Further, one or more portions of the method 1000 can be executed or implemented as an algorithm on the hardware devices or systems disclosed herein. In some embodiments, one or more portions of the method 1200 can be performed as part of the method 900 that is described with respect to FIG. 9. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include determining one or more locations associated with the one or more assets. Determining the one or more locations can be based on location information associated with and/or included in the resource data. The one or more locations can comprise one or more administrative divisions (e.g., nations, states, and/or provinces). For example, the computing system 110 can determine, based on the address of an asset comprising real property, the location of the real property. Further, the computing system 110 can determine, based on boat registration information, the address of an asset comprising a yacht, the location of the yacht. By way of further example, the computing system 110 can determine, based on the network address associated with an asset comprising a computing device, the location of the computing device (e.g., physical location and/or IP address).

At 1204, the method 1200 can include determining the one or more rules associated with the one or more locations. For example, the computing system 110 can access one or more rules that can be associated with and/or based on one or more laws of a location. The one or more rules regarding the network access policies, probate tax, and/or probate fees payable for assets of resources in one location (e.g., in the state of California in the United States) may be different from the one or more rules in another state of the United States.

Figure 13:
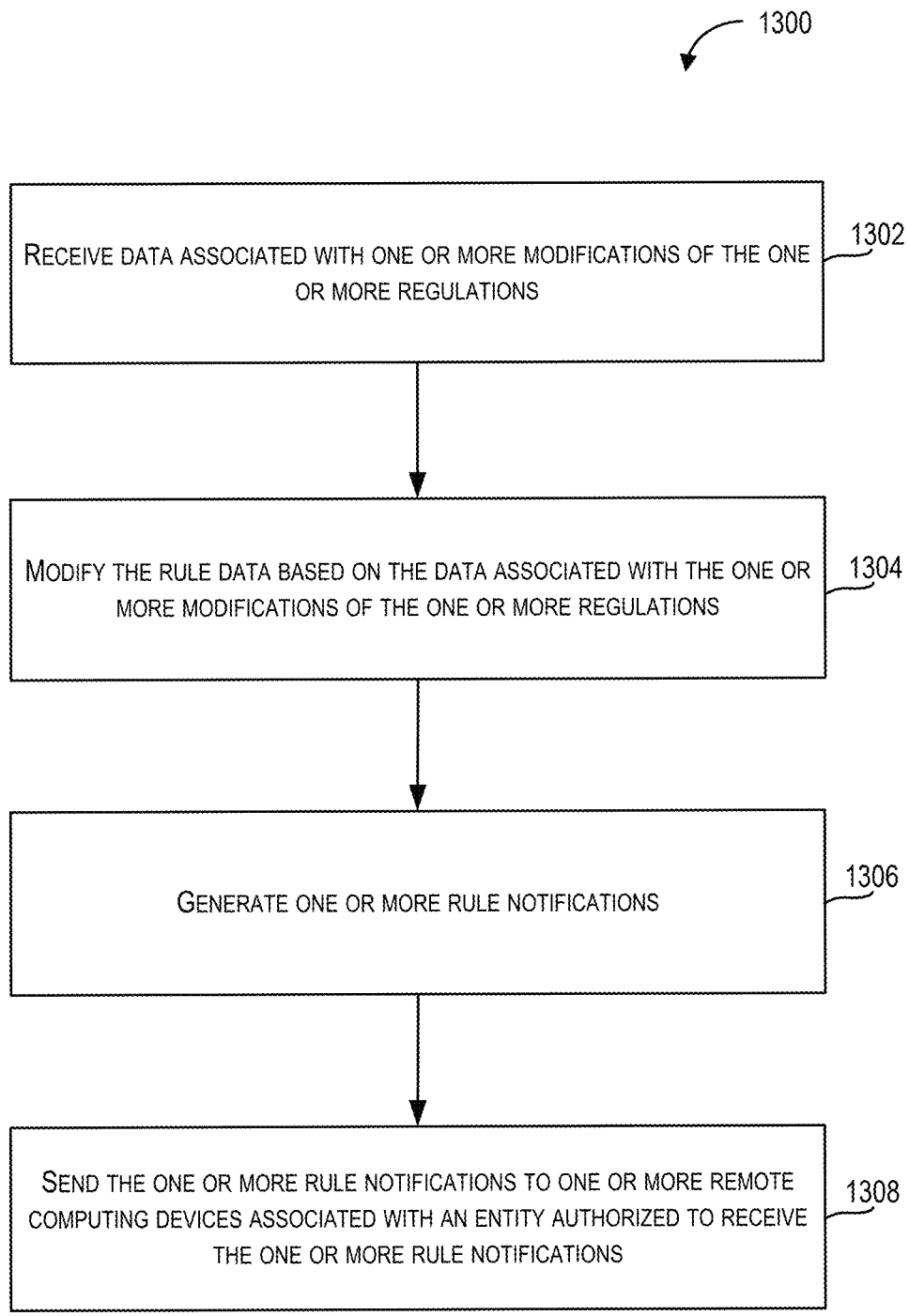
FIG. 13 depicts a flow diagram of an example method for generating resource data according to example embodiments of the present disclosure.

FIG. 13 depicts a flow diagram of generating resource data according to example embodiments of the present disclosure. One or more portions of the method 1000 can be executed and/or implemented on one or more computing devices or computing systems including, for example, the computing system 110, the remote computing system 130, the one or more computing devices 152, and/or the computing device 200. Further, one or more portions of the method 1000 can be executed or implemented as an algorithm on the hardware devices or systems disclosed herein. In some embodiments, one or more portions of the method 1300 can be performed as part of the method 900 that is described with respect to FIG. 9. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include receiving data associated with one or more modifications of the one or more regulations. In some embodiments, the one or more rules of the rule data can be based on one or more regulations associated with the resources. For example, the computing system 110 can receive data indicating that one or more regulations associated with one or more computing assets have been modified. For example, the one or more modifications of the one or more regulations can comprise an increase in the number of computing assets of a computing network. By way of further example, the computing system 110 can receive data indicating that one or more regulations associated with one or more assets have been modified. For example, the one or more modifications of the one or more regulations can comprise an increase in the probate tax in the location of an asset.

At 1304, the method 1300 can include modifying the rule data based on the data associated with one or more modifications of the one or more regulations. For example, the computing system can access the rule data and based on one or more modifications of the one or more regulations comprising a modification of a user authentication policy, the computing system 110 can update the rule data to include the new modified user authentication policy. By way of further example, the computing system can access the rule data and based on one or more modifications of the one or more regulations comprising a modification of a probate tax rate the computing system 110 can update the rule data to include the new modified probate tax rate.

At 1306, the method 1300 can include generating one or more rule modification notifications associated with the one or more modifications of the one or more regulations. In some embodiments, the one or more indications associated with the resource allocation instructions can comprise the one or more rule modification notifications. For example, based on receiving data associated with one or more modifications of one or more regulations, the computing system 110 can generate one or more rule modification notifications that can indicate the regulation that is being modified and/or the specific modification of the regulation.

At 1308, the method 1300 can include sending the one or more rule modification notifications to one or more remote computing devices associated with an entity authorized to receive the one or more rule modification notifications. For example, the computing system 110 can send the one or more rule modification notifications to an entity that is authorized to receive the one or more rule modification notifications such as a resource manager that has been entrusted with managing resources. Further, the one or more rule modification notifications can be sent via a network (e.g., the network 102).

Numerous details are set forth in the foregoing description. However, it will be apparent to one of ordinary skills in the art having the benefit of this disclosure that the present disclosure may be practiced without these specific details. In some instances, structures and devices are shown in block diagram form, rather than in detail, to avoid obscuring the present disclosure.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method comprising:

generating, by a computing system comprising one or more processors, based on inputting one or more resource documents into one or more machine-learning models, one or more prompts comprising requests for information associated with resource allocation instructions for distribution of resources, wherein the one or more machine-learning models are configured to generate the one or more prompts based on recognition of textual features of the one or more resource documents associated with the resources, wherein the one or more resource documents comprise one or more resource document fields, and wherein the resource allocation instructions are associated with distribution of one or more assets of the resources to one or more entities comprising one or more resource recipients;

receiving, by the computing system, one or more responses to the one or more prompts;

generating, by the computing system, based on inputting the one or more responses and rule data comprising one or more rules associated with the resources into the one or more machine-learning models, resource data comprising one or more resource data fields and one or more resource data field values that correspond to the one or more resource data fields, wherein the one or more machine-learning models are trained based on training data comprising training resource data and training rule data, and wherein the one or more resource data fields are based on the one or more resource document fields, and wherein the one or more resource data field values are based on the one or more responses;

generating, by the computing system, based on the resource data, one or more indications associated with the resource allocation instructions, wherein the one or more indications comprise one or more visualizations of the distribution of the one or more assets to the one or more resource recipients; and updating, by the computing system, the one or more visualizations in real-time based on changes in one or more values of the one or more assets.

2. The computer-implemented method of claim 1, further comprising:

receiving, by the computing system, an asset valuation request associated with a projected asset valuation of the one or more assets; and determining, by the computing system, based on the resource data, the projected asset valuation of the one or more assets, wherein the one or more indications associated with the resource allocation instructions comprise the projected asset valuation of the one or more assets.

3. The computer-implemented method of claim 2, wherein the one or more machine-learning models comprise one or more machine-learning asset projection models, and wherein the projected asset valuation is based on inputting the resource data and financial data into the one or more machine-learning asset projection models that are configured to generate the projected asset valuation, wherein the financial data comprises one or more predicted asset appreciation rates or one or more asset depreciation rates.

4. The computer-implemented method of claim 1, further comprising:

receiving, by the computing system, an asset distribution request associated with a projected asset distribution of the one or more assets to the one or more entities;

determining, by the computing system, based on the resource data, one or more relationships between the one or more entities; and determining, by the computing system, based on the resource data and the one or more relationships between the one or more entities, a plurality of projected asset distributions of the one or more assets to the one or more entities, wherein the one or more indications associated with the resource allocation instructions comprise the plurality of projected asset distributions of the one or more assets to the one or more entities.

5. The computer-implemented method of claim 4, wherein the one or more machine-learning models comprise one or more machine-learning distribution projection models, and wherein the projected asset distribution is based on inputting the resource data and relationship data associated with the one or more relationships into the one or more machine-learning distribution projection models that are configured to generate the projected asset distribution.

6. The computer-implemented method of claim 1, further comprising:

receiving, by the computing system, one or more conditions associated with the one or more entities or the one or more assets; and determining, by the computing system, one or more scenarios associated with the one or more conditions, wherein the one or more scenarios comprise one or more projected valuations of the one or more assets or one or more predicted distributions of the one or more assets to the one or more resource recipients, wherein the one or more indications associated with the resource allocation instructions comprise the one or more scenarios associated with the one or more scenarios.

7. The computer-implemented method of claim 6, wherein the one or more conditions comprise a possible life expectancy of the one or more entities or a possible valuation of the one or more assets.

8. The computer-implemented method of claim 6, wherein the one or more machine-learning models comprise one or more machine-learning scenario models, and wherein the determining the one or more scenarios is based on inputting the resource data and the one or more conditions into the one or more machine-learning scenario models that are configured to generate the one or more scenarios.

9. The computer-implemented method of claim 1, further comprising:

receiving, by the computing system, event data comprising information associated with a plurality of events associated with the resources;

determining, by the computing system, based on the resource data, whether one or more events of the plurality of events satisfy one or more event criteria; and generating, by the computing system, one or more event notifications associated with the one or more events that satisfy the one or more event criteria, wherein the one or more indications associated with the resource allocation instructions comprise the one or more event notifications.

10. The computer-implemented method of claim 9, further comprising:

sending, by the computing system, the one or more event notifications to one or more remote computing devices associated with an entity that is authorized to receive the one or more event notifications.

11. The computer-implemented method of claim 9, wherein the plurality of events comprise marriage, divorce, receipt of a new asset, birth of a child, or death of at least one of the one or more entities.

12. The computer-implemented method of claim 1, wherein the one or more resource documents comprise one or more network policies, one or more user guides, one or more access policies, one or more authorization policies, one or more authentication policies, one or more wills, one or more trusts, a power of attorney, one or more titles, one or more deeds, one or more account resource recipient designations, one or more guardianship designations, one or more insurance policies, or one or more healthcare directives.

13. The computer-implemented method of claim 1, wherein the generating, by the computing system, based on one or more responses and rule data comprising one or more rules associated with the resources, resource data comprising one or more resource data fields and one or more resource data field values that correspond to the one or more resource data fields, wherein the one or more resource data fields are based on the one or more resource document fields, and wherein the one or more resource data field values are based on the one or more responses comprises:
    determining, by the computing system, one or more locations associated with the one or more assets, wherein the one or more locations comprise one or more administrative divisions; and
    determining, by the computing system, the one or more rules associated with the one or more locations.

14. The computer-implemented method of claim 1, wherein the one or more entities further comprise one or more trustees of the resources or one or more creditors, and wherein the one or more assets comprise real property, tangible personal property, one or more securities, or cash.

15. The computer-implemented method of claim 1, wherein the one or more rules are based on one or more regulations associated with the resources, and further comprising:
    receiving, by the computing system, data associated with one or more modifications of the one or more regulations;
    modifying, by the computing system, the rule data based on the data associated with one or more modifications of the one or more regulations, and
    generating, by the computing system, one or more rule modification notifications associated with the one or more modifications of the one or more regulations, wherein the one or more indications associated with the resource allocation instructions comprise the one or more rule modification notifications.

16. The computer-implemented method of claim 15, further comprising:
    sending, by the computing system, the one or more rule modification notifications to one or more remote computing devices associated with an entity authorized to receive the one or more rule modification notifications.

17. A computing system, comprising:
    one or more processors;
    one or more non-transitory computer-readable media storing instructions that, when executed by the one or more processors, cause the computing system to perform operations, the operations comprising:
        generating, based on inputting one or more resource documents into one or more machine-learning models, one or more prompts comprising requests for information associated with resource allocation instructions associated with resources, wherein the one or more machine-learning models are configured to generate the one or more prompts based on recognition of textual features of the one or more resource documents associated with the resources, wherein the one or more resource documents comprise one or more resource document fields, and wherein the resource allocation instructions are associated with distribution of one or more assets of the resources to one or more entities comprising one or more resource recipients;
    receiving one or more responses to the one or more prompts;
    generating, based on inputting the one or more responses and rule data comprising one or more rules associated with the resources into the one or more machine-learning models, resource data comprising one or more resource data fields and one or more resource data field values that correspond to the one or more resource data fields, wherein the one or more machine-learning models are trained based on training data comprising training resource data and training rule data, and wherein the one or more resource data fields are based on the one or more resource document fields, and wherein the one or more resource data field values are based on the one or more responses;
    generating, based on the resource data, one or more indications associated with the resource allocation instructions, wherein the one or more indications comprise one or more visualizations of the distribution of the one or more assets to the one or more resource recipients; and
    updating the one or more visualizations in real-time based on changes in one or more values of the one or more assets.

18. The computing system of claim 17, wherein the one or more rules are based on one or more regulations associated with the resources, and wherein the operations further comprise:
    receiving data associated with one or more modifications of the one or more regulations;
    modifying the rule data based on the data associated with one or more modifications of the one or more regulations; and
    generating one or more rule modification notifications associated with the one or more modifications of the one or more regulations, wherein the one or more indications associated with the resource allocation instructions comprise the one or more rule modification notifications.

19. One or more non-transitory computer-readable media that collectively store instructions that, when executed by one or more computing devices, cause the one or more computing devices to perform operations, the operations comprising:
    generating, based on inputting one or more resource documents into one or more machine-learning models, one or more prompts comprising requests for information associated with resource allocation instructions associated with resources, wherein the one or more machine-learning models are configured to generate the one or more prompts based on recognition of textual features of the one or more resource documents associated with the resources, wherein the one or more resource documents comprise one or more resource document fields, and wherein the resource allocation instructions are associated with distribution of one or more assets of the resources to one or more entities comprising one or more resource recipients;

receiving one or more responses to the one or more prompts;

generating, based on inputting the one or more responses and rule data comprising one or more rules associated with the resources into the one or more machine-learning models, resource data comprising one or more resource data fields and one or more resource data field values that correspond to the one or more resource data fields, wherein the one or more machine-learning models are trained based on training data comprising training resource data and training rule data, and wherein the one or more resource data fields are based on the one or more resource document fields, and wherein the one or more resource data field values are based on the one or more responses;

generating, based on the resource data, one or more indications associated with the resource allocation instructions, wherein the one or more indications comprise one or more visualizations of the distribution of the one or more assets to the one or more resource recipients; and updating the one or more visualizations in real-time based on changes in one or more values of the one or more assets.

20. The one or more non-transitory computer-readable media of claim 19, wherein the one or more rules are based on one or more regulations associated with the resources, and wherein the operations further comprise:

receiving data associated with one or more modifications of the one or more regulations;

modifying the rule data based on the data associated with one or more modifications of the one or more regulations; and generating one or more rule modification notifications associated with the one or more modifications of the one or more regulations, wherein the one or more indications associated with the resource allocation instructions comprise the one or more rule modification notifications.

* * * * *